US012050283B2

(12) United States Patent
Srinivas et al.

(10) Patent No.: US 12,050,283 B2
(45) Date of Patent: Jul. 30, 2024

(54) ESTIMATION AND TRACKING OF POSITION INFORMATION IN A DISTRIBUTED RADIO FREQUENCY (RF) COMMUNICATIONS SYSTEM

(71) Applicants: Sharanya Srinivas, Tempe, AZ (US); Andrew Herschfelt, Phoenix, AZ (US); Daniel W. Bliss, Scottsdale, AZ (US)

(72) Inventors: Sharanya Srinivas, Tempe, AZ (US); Andrew Herschfelt, Phoenix, AZ (US); Daniel W. Bliss, Scottsdale, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 392 days.

(21) Appl. No.: 17/089,086

(22) Filed: Nov. 4, 2020

(65) Prior Publication Data

US 2021/0132182 A1 May 6, 2021

Related U.S. Application Data

(60) Provisional application No. 62/930,236, filed on Nov. 4, 2019.

(51) Int. Cl.
*G01S 5/00* (2006.01)
*G01S 5/02* (2010.01)
(Continued)

(52) U.S. Cl.
CPC ............ *G01S 5/0294* (2013.01); *G01S 19/26* (2013.01); *H04B 7/0413* (2013.01)

(58) Field of Classification Search
CPC ...... G01S 5/0294; G01S 19/26; H04B 7/0413
See application file for complete search history.

(56) References Cited

U.S. PATENT DOCUMENTS

| 4,648,099 A | 3/1987 | Kerr |
| 5,510,800 A | 4/1996 | McEwan |

(Continued)

FOREIGN PATENT DOCUMENTS

| CA | 2298812 A1 | 1/2000 | |
| EP | 2137547 B1 | 3/2008 | |
| KR | 20120010708 A | * 2/2012 | ........... G01S 5/0294 |

OTHER PUBLICATIONS

Bidigare, P. et al., "Attaining Fundamental Bounds on Timing Synchronization," 2012 IEEE International Conference on Acoustics, Speech and Signal Processing (ICASSP 2012), Mar. 25-30, 2012, Kyoto, Japan, IEEE, pp. 5229-5232.

(Continued)

*Primary Examiner* — Pakee Fang
(74) *Attorney, Agent, or Firm* — Withrow & Terranova, P.L.L.C.

(57) ABSTRACT

Position information estimation in a distributed radio frequency (RF) communications system is provided. Embodiments disclosed herein facilitate high-precision estimations of positions, orientations, velocities, and acceleration of network nodes in a distributed RF network. The distributed RF communications system incorporates a series of estimation processes which makes it susceptible to propagation of errors. To ensure robustness of the distributed RF communications system, relative positions of network nodes are tracked by iteratively tracking parameters used for estimating position information. Some embodiments take advantage of Kalman filtering algorithms by leveraging principles directed by physics. At every network node, several filtering algorithms can be employed to synchronize clocks, track delay between multiple-input multiple-output (MIMO) antennas and estimate position and orientation of other network nodes. Information from other sensors like global (Continued)

positioning system (GPS) and inertial navigation system (INS) can also be employed to further improve estimation processes.

23 Claims, 8 Drawing Sheets

(51) Int. Cl.
  *G01S 19/26* (2010.01)
  *H04B 7/0413* (2017.01)

(56) References Cited

U.S. PATENT DOCUMENTS

| | | | |
|---|---|---|---|
| 5,592,181 | A | 1/1997 | Cai et al. |
| 6,204,812 | B1 | 3/2001 | Fattouche et al. |
| 6,421,330 | B1 * | 7/2002 | Chung ............... H04J 13/00 370/335 |
| 6,611,234 | B2 | 8/2003 | Fullerton et al. |
| 6,687,507 | B2 | 2/2004 | Fischer et al. |
| 7,173,919 | B1 | 2/2007 | Dabak |
| 7,286,624 | B2 | 10/2007 | Woo et al. |
| 7,639,730 | B2 | 12/2009 | Rasmussen |
| 7,710,321 | B2 | 5/2010 | Heidari-Bateni et al. |
| 8,184,504 | B2 | 5/2012 | Altman et al. |
| 8,253,627 | B1 | 8/2012 | Burgess |
| 8,442,172 | B1 * | 5/2013 | Dokania ............ H04B 1/7073 375/327 |
| 9,019,159 | B2 | 4/2015 | van Puijenbroek et al. |
| 9,060,342 | B2 | 6/2015 | Wu |
| 9,196,164 | B1 | 11/2015 | Urmson et al. |
| 9,756,599 | B2 | 9/2017 | Fischer |
| 9,774,996 | B1 | 9/2017 | Frydman et al. |
| 9,883,348 | B1 | 1/2018 | Walker et al. |
| 10,681,669 | B2 | 6/2020 | Priyanto et al. |
| 2003/0080902 | A1 | 5/2003 | Roberts |
| 2005/0047427 | A1 | 3/2005 | Kashima et al. |
| 2007/0109188 | A1 | 5/2007 | Zimmerman et al. |
| 2008/0165059 | A1 | 7/2008 | Karr |
| 2009/0285339 | A1 | 11/2009 | Zhang et al. |
| 2010/0226454 | A1 | 9/2010 | Bliss et al. |
| 2010/0271263 | A1 * | 10/2010 | Moshfeghi ............ A63F 13/235 342/378 |
| 2010/0273506 | A1 | 10/2010 | Stern-Berkowitz et al. |
| 2010/0304708 | A1 | 12/2010 | McCrady et al. |
| 2011/0158200 | A1 | 6/2011 | Bachu et al. |
| 2012/0026041 | A1 * | 2/2012 | Murdock ................ G01S 5/14 342/357.51 |
| 2012/0169542 | A1 | 7/2012 | Mathews et al. |
| 2013/0184011 | A1 | 7/2013 | Kaushansky |
| 2013/0285856 | A1 | 10/2013 | Opshaug et al. |
| 2014/0105054 | A1 | 4/2014 | Saegrov et al. |
| 2014/0186037 | A1 * | 7/2014 | Dahlfort ............ H04J 14/0267 398/49 |
| 2015/0282112 | A1 | 10/2015 | Bialer et al. |
| 2016/0252624 | A1 | 9/2016 | MacCurdy et al. |
| 2016/0302165 | A1 * | 10/2016 | Da ...................... H04W 56/001 |
| 2017/0003376 | A1 * | 1/2017 | Wellman ............... H04K 3/822 |
| 2017/0367065 | A1 * | 12/2017 | Seth .................. H04L 43/0864 |
| 2018/0227877 | A1 | 8/2018 | Gunnarsson et al. |
| 2019/0200164 | A1 | 6/2019 | Sanderovich et al. |
| 2020/0260225 | A1 | 8/2020 | Herschfelt et al. |
| 2020/0319330 | A1 | 10/2020 | Bliss |
| 2021/0132177 | A1 | 5/2021 | Srinivas et al. |

OTHER PUBLICATIONS

Bidigare, P. et al., "Initial Over-the-Air Performance Assessment of Ranging and Clock Synchronization Using Radio Frequency Signal Exchange," 2012 IEEE Statistical Signal Processing Workshop (SSP), Aug. 5-8, 2012, Ann Arbor, MI, IEEE, pp. 273-276.
Bliss, D. et al., "Adaptive Wireless Communications: MIMO Channels and Networks," 2013, Cambridge University Press, 619 pages.
Busse, F.D. et al., "Demonstration of Adaptive Extended Kalman Filter for Low-Earth-Orbit Formation Estimation Using CDGPS," Navigation: Journal of the Institute of Navigation, vol. 50, No. 2, Summer 2003, pp. 79-93.
Denis, B. et al., "Joint Distributed Synchronization and Positioning in UWB Ad Hoc Networks Using TOA," IEEE Transactions on Microwave Theory and Techniques, vol. 54, No. 4, Apr. 2006, IEEE, pp. 1896-1911.
Guvenc, I. et al., "A Survey on TOA Based Wireless Localization and NLOS Mitigation Techniques," IEEE Communications Surveys & Tutorials, vol. 11, No. 3, Third Quarter 2009, IEEE, pp. 107-124.
Kay, S.M., "Fundamentals of Statistical Signal Processing, vol. I: Estimation Theory," 1993, Prentice Hall, 303 pages.
Kim, H., "Double-Sided Two-Way Ranging Algorithm to Reduce Ranging Time," IEEE Communications Letters, vol. 13, No. 7, Jul. 2009, IEEE, pp. 486-488.
Lanzisera, S. et al., "Radio Frequency Time-of-Flight Distance Measurement for Low-Cost Wireless Sensor Localization," IEEE Sensors Journal, vol. 11, No. 3, Mar. 2011, IEEE, pp. 837-845.
Li, Q. et al., "Global Clock Synchronizationin Sensor Networks," IEEE Transactions on Computers, vol. 55, No. 2, Feb. 2006, IEEE, pp. 214-226.
Li, X.R. et al., "Survey of ManeuveringTarget Tracking. Part I: Dynamic Models," IEEE Transactions on Aerospace and Electronic Systems, vol. 34, No. 4, Oct. 2003, IEEE, pp. 1333-1364.
Liu, H. et al., "Survey of Wireless Indoor Positioning Techniques and Systems," IEEE Transactions on Systems, Man, and Cybernetics—Part C: Applications and Reviews, vol. 37, No. 6, Nov. 2007, IEEE, pp. 1067-1080.
Mills, D.L. et al., "Internet Time Synchronization: The Network Time Protocol," IEEE Transactions on Communications, vol. 39, No. 10, Oct. 1991, IEEE, pp. 1482-1493.
Mills, D.L., "Network Time Protocol (Version 3) Specification, Implementation and Analysis," Network Working Group, Request for Comments: 1305, Mar. 1992, 120 pages.
Oh, D.-G., "A Novel Time Delay Estimation Using Chirp Signals Robust to Sampling Frequency Offset for a Ranging System," IEEE Communications Letters, vol. 14, No. 5, May 2010, IEEE, pp. 450-452.
Paul, B. et al., "Survey of RF Communications and Sensing Convergence Research," Survey of RF Communications and Sensing Convergence Research, vol. 5, 2017, IEEE, 20 pages.
Pelka, M. et al., "Evaluation of time-based ranging methods: Does the choice matter?," 2017 14th Workshop on Positioning, Navigation and Communications (WPNC), Oct. 25-26, 2017, Bremen, IEEE, 6 pages.
Sundararaman, B. et al., "Clock synchronization for wireless sensor networks: a survey," Ad Hoc Networks, vol. 3, Issue 3, 2005, Elsevier B.V., pp. 281-323.
Zucca, C. et al., "The Clock Model and Its Relationship with the Allan and Related Variances," IEEE Transactions on Ultrasonics, Ferroelectrics, and Frequency Control, vol. 52, No. 2, Feb. 2005, IEEE, pp. 289-296.
International Search Report and Written Opinion for International Patent Application No. PCT/US2018/066763, mailed Apr. 29, 2019, 10 pages.
International Preliminary Report on Patentability for International Patent Application No. PCT/US2018/066763, mailed Jul. 2, 2020, 7 pages.
Notice of Allowance for U.S. Appl. No. 16/787,300, mailed Sep. 3, 2021, 8 pages.
Non-Final Office Action for U.S. Appl. No. 16/787,300, mailed May 12, 2021, 9 pages.
Bliss, D., "Cooperative radar and communications signaling: The estimation and information theory odd couple," 2014 IEEE Radar Conference, May 19-23, 2014, Cincinnati, OH, USA, IEEE, 6 pages.
Brown III, D.R. et al., "Non-Hierarchical Clock Synchronization for Wireless Sensor Networks," arXiv:1212.1216v1 [nlin.AO], Dec. 6, 2012, 8 pages.
Chiriyath, A. et al., "Inner Bounds on Performance of Radar and Communications Co-Existence," IEEE Transactions on Signal Processing, vol. 64, Issue 2, Sep. 2015, IEEE, pp. 464-474.

(56) References Cited

OTHER PUBLICATIONS

Chiriyath, A.R. et al., "Joint radar-communications performance bounds: Data versus estimation information rates," MILCOM 2015—2015 IEEE Military Communications Conference, Oct. 26-28, 2015, Tampa, FL, USA, IEEE, 6 pages.

Chiriyath, A. et al., "Radar-Communications Convergence: Coexistence, Cooperation, and Co-Design," IEEE Transactions on Cognitive Communications and Networking, vol. 3, No. 1, Feb. 2017, IEEE, 13 pages.

Gelb, A., "Applied optimal estimation," MIT press, Apr. 1974, 192 pages.

Gutierrez, R. et al., "Joint radar-communications system implementation using software defined radios: Feasibility and results," 2017 51st Asilomar Conference on Signals, Systems, and Computers, Oct. 29-Nov. 1, 2017, Pacific Grove, CA, USA, IEEE, 6 pages.

Herschfelt, A., "Simultaneous Positioning and Communications:Hybrid Radio Architecture, Estimation Techniques, and Experimental Validation," A Dissertation Presented in Partial Fulfillment of the Requirement for the Degree Doctor of Philosophy, Arizona State University, Dec. 2019, 119 pages.

Paul, B. et al., "Constant information radar for dynamic shared spectrum access," 2015 49th Asilomar Conference on Signals, Systems and Computers, Nov. 8-11, 2015, Pacific Grove, CA, USA, IEEE, 5 pages.

Paul, B. et al., "Extending joint radar-communications boundsfor fmcw radar with doppler estimation," 2015 IEEE Radar Conference(RadarCon), May 10-15, 2015, Arlington, VA, USA, IEEE, 6 pages.

Paul, B. et al., "Joint communications and radar performance bounds under continuous waveform optimization: The waveform awakens," 2016 IEEE Radar Conference (RadarConf), May 2-6, 2016, Philadelphia, PA, USA, IEEE, 6 pages.

Paul, B. et al., "The Constant Information Radar," Entropy, vol. 18, No. 9, Sep. 2016, MDPI, 23 pages.

Non-Final Office Action for U.S. Appl. No. 16/767,043, mailed Apr. 11, 2022, 23 pages.

Herschfelt, A. et al., "Spectrum Management and Advanced Receiver Techniques (SMART): Joint Radar-Communications Network Performance," 2018 IEEE Radar Conference (RadarConf18), Apr. 23-27, 2018, Oklahoma City, OK, USA, IEEE, 6 pages.

Ma, O. et al., "Cooperative Radar and Communications Coexistence Using Reinforcement Learning," 2018 52nd Asilomar Conference on Signals, Systems, and Computers, Oct. 28-31, 2018, IEEE, Pacific Grove, CA, IEEE, 5 pages.

Rong, Y. et al., "MIMO Radar and Communications Spectrum Sharing: A Multiple-Access Perspective," 2018 IEEE 10th Sensor Array and Multichannel Signal Processing Workshop (SAM), Jul. 8-11, 2018, Sheffield, UK, IEEE, 5 pages.

Non-Final Office Action for U.S. Appl. No. 17/521,490, mailed Nov. 10, 2022, 7 pages.

Non-Final Office Action for U.S. Appl. No. 17/089,074, mailed Nov. 18, 2022, 18 pages.

Notice of Allowance for U.S. Appl. No. 16/767,043, mailed Mar. 22, 2023, 9 pages.

Final Office Action for U.S. Appl. No. 17/521,490, mailed Mar. 31, 2023, 8 pages.

Applicant-Initiated Interview Summary for U.S. Appl. No. 17/089,074, mailed Jan. 27, 2023, 6 pages.

Final Office Action for U.S. Appl. No. 17/089,074, mailed Apr. 19, 2023, 17 pages.

Notice of Allowance for U.S. Appl. No. 17/521,490, mailed Jul. 25, 2023, 11 pages.

Advisory Action for U.S. Appl. No. 17/089,074, mailed Jul. 28, 2023, 3 pages.

Notice of Allowance for U.S. Appl. No. 17/089,074, mailed Mar. 6, 2024, 8 pages.

Non-Final Office Action for U.S. Appl. No. 17/589,245, mailed May 6, 2024, 11 pages.

* cited by examiner

ESTIMATION AND TRACKING OF POSITION INFORMATION IN A DISTRIBUTED RADIO FREQUENCY (RF) COMMUNICATIONS SYSTEM

RELATED APPLICATIONS

This application claims the benefit of provisional patent application Ser. No. 62/930,236, filed Nov. 4, 2019, the disclosure of which is hereby incorporated herein by reference in its entirety.

The present application is related to U.S. patent application Ser. No. 17/089,074, filed on Nov. 4, 2020, entitled "POSITION INFORMATION ESTIMATION IN A DISTRIBUTED RADIO FREQUENCY (RF) COMMUNICATIONS SYSTEM," which is hereby incorporated herein by reference in its entirety

FIELD OF THE DISCLOSURE

The present disclosure relates to relative positioning of vehicles based on an exchange of wireless signals.

BACKGROUND

Positioning systems are used to provide information regarding relative positions of objects. For example, vehicle positioning systems use radio frequency (RF) communications to assist operators in travel and operation of air and ground vehicles. For example, aircraft positioning systems assist operators of various aircraft, particularly in critical tasks such as landing. Such positioning systems enable takeoff and landing in low visibility conditions through autonomous systems or presenting pilots with information which enables more accurate manual operation. Aircraft positioning systems are also critical for remote controlled tasks.

Modern vehicle systems, especially unmanned aerial systems (UASs), need to perform more sophisticated tasks in higher density networks than many legacy radio systems can support. This leads to an inflation of RF devices in already congested environments, which consumes limited spectral resources and introduces more interference to existing systems. To support this growing demand for capabilities, performance, and number of users, modern radio systems must use limited spectral access more efficiently and limit interference to nearby systems. Recent results in the field of RF convergence indicate that modern co-design techniques can increase spectral efficiency and limit mutual interference between cooperative systems.

SUMMARY

Estimation and tracking of position information in a distributed radio frequency (RF) communications system is provided. Embodiments disclosed herein facilitate high-precision estimations of positions, orientations, velocities, and acceleration of network nodes in a distributed RF network (e.g., including base stations and vehicles, such as aircraft or unmanned aerial systems (UASs)). Modern radio systems must adapt to limited spectral access by reducing spectrum demand and increasing operational efficiency. In this regard, an RF system is provided which simultaneously performs positioning and communications tasks. This system specifically addresses the issue of spectral congestion by employing an extremely efficient positioning strategy and using a joint waveform that simultaneously enables both tasks. This efficiency in turn supports more users in a given frequency allocation.

The distributed RF communications system incorporates a series of estimation processes which makes it susceptible to propagation of errors. To ensure robustness of the distributed RF communications system, relative positions of network nodes are tracked by iteratively tracking parameters used for estimating position information. The parameters can be iteratively tracked through a hidden Markov model, such as adaptive filtering. Some embodiments take advantage of Kalman filtering algorithms by leveraging principles directed by physics. At every network node, several filtering algorithms can be employed to synchronize clocks, track delay between multiple-input multiple-output (MIMO) antennas and estimate position and orientation of other network nodes. Information from other sensors like global positioning system (GPS) and inertial navigation system (INS) can also be employed to further improve estimation processes.

An exemplary embodiment provides a method for tracking position information in a distributed RF communications system. The method includes receiving a first RF receive signal from a first network node. The method further includes estimating a first clock offset from the first network node using the first RF receive signal, estimating a first time delay of the first RF receive signal using the first RF receive signal, and estimating first position information from the estimated first clock offset and the estimated first time delay. The method further includes iteratively tracking one or more parameters selected from the estimated first clock offset, the estimated first time delay, or the estimated first position information.

Another exemplary embodiment provides an RF device. The RF device includes an RF transceiver and a signal processor coupled to the RF transceiver. The signal processor is configured to receive, from the RF transceiver, a first RF receive signal comprising a first positioning sequence of a first network node, estimate a first time delay of the first RF receive signal using the first positioning sequence, estimate first position information from the estimated first time delay, and track the estimated first time delay to adjust the first position information.

Another exemplary embodiment provides a distributed RF communications system. The distributed RF communications system includes a first RF device, which comprises a first RF transceiver and a first signal processor coupled to the first RF transceiver. The first signal processor is configured to receive, from the first RF transceiver, a first RF receive signal from a second RF device. The first signal processor is further configured to estimate a first clock offset from the second RF device using the first RF receive signal, estimate a first time delay of the first RF receive signal using the first RF receive signal, and estimate first position information from the estimated first clock offset and the estimated first time delay. The first signal processor is further configured to iteratively track one or more parameters selected from the estimated first clock offset, the estimated first time delay, or the estimated first position information.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
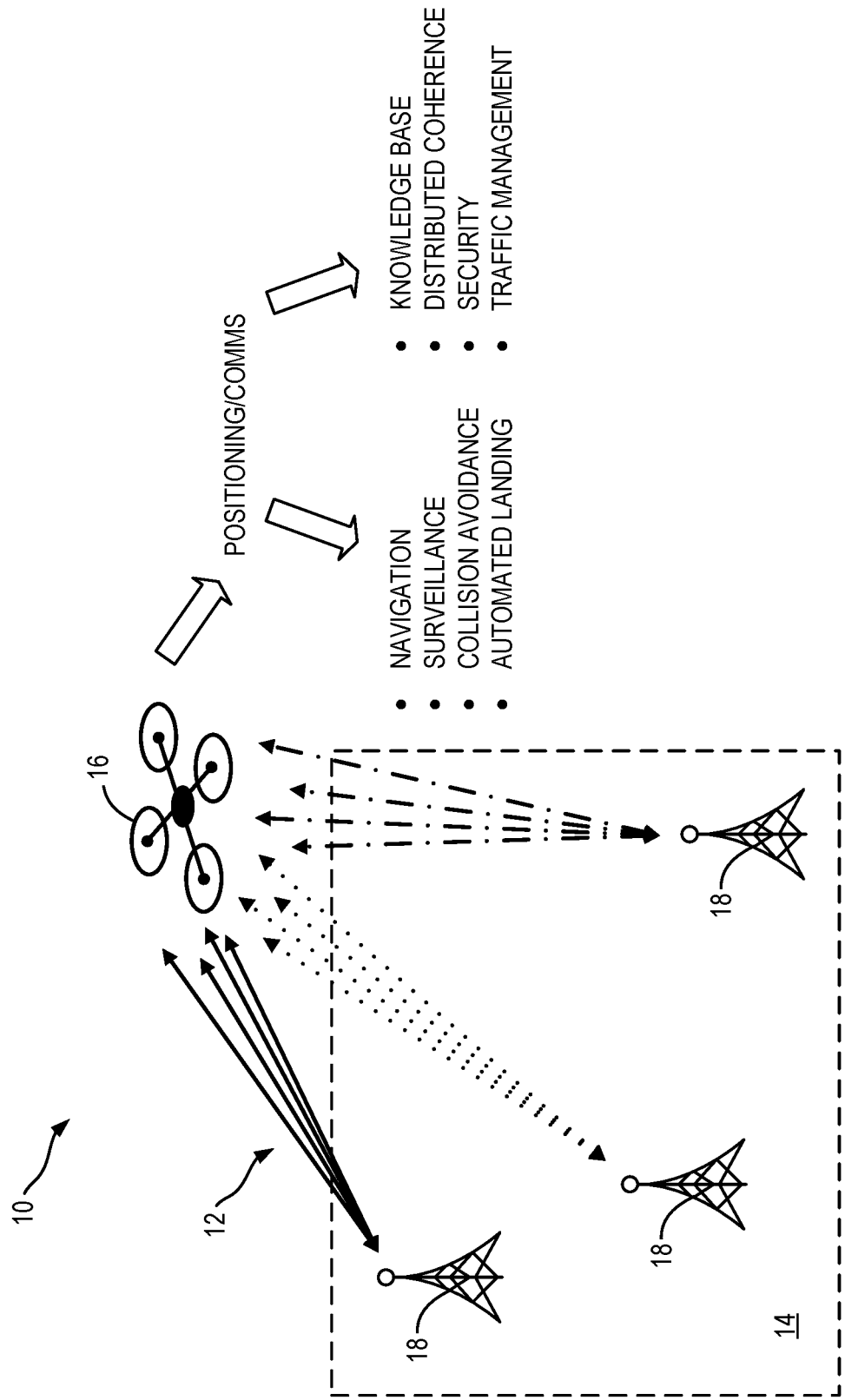
FIG. 1 is a schematic diagram of an exemplary distributed radio frequency (RF) communications system which can estimate and track position information according to embodiments disclosed herein.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Estimation and tracking of position information in a distributed radio frequency (RF) communications system is provided. Embodiments disclosed herein facilitate high-precision estimations of positions, orientations, velocities, and acceleration of network nodes in a distributed RF network (e.g., including base stations and vehicles, such as aircraft or unmanned aerial systems (UASs)). Modern radio systems must adapt to limited spectral access by reducing spectrum demand and increasing operational efficiency. In this regard, an RF system is provided which simultaneously performs positioning and communications tasks. This system specifically addresses the issue of spectral congestion by employing an extremely efficient positioning strategy and using a joint waveform that simultaneously enables both tasks. This efficiency in turn supports more users in a given frequency allocation.

The distributed RF communications system incorporates a series of estimation processes which makes it susceptible to propagation of errors. To ensure robustness of the distributed RF communications system, relative positions of network nodes are tracked by iteratively tracking parameters used for estimating position information. The parameters can be iteratively tracked through a hidden Markov model, such as adaptive filtering. Some embodiments take advantage of Kalman filtering algorithms by leveraging principles directed by physics. At every network node, several filtering algorithms can be employed to synchronize clocks, track delay between multiple-input multiple-output (MIMO) antennas and estimate position and orientation of other network nodes. Information from other sensors like global positioning system (GPS) and inertial navigation system (INS) can also be employed to further improve estimation processes.

I. Overview

FIG. 1 is a schematic diagram of an exemplary distributed RF communications system 10 which can estimate and track position information according to embodiments disclosed herein. In the distributed RF communications system 10, RF signals 12 are exchanged between network nodes in order to facilitate estimation of position information of the network nodes. In the illustrated example, the network nodes include a base station 14 (e.g., a first network node) and an aircraft 16 (e.g., a second network node, such as a UAS). In an exemplary aspect, the aircraft 16 can estimate its position information (e.g., range, position, orientation, and/or acceleration) relative to the base station 14 from the exchanged RF signals 12. In some examples, the base station 14 (and each additional network node in the distributed RF communications system 10) can likewise estimate such position information.

The position information of the aircraft 16 can be used for various tasks, such as formation flying, coordination of safe flight paths, takeoff, landing, and taxiing. In some examples, the RF signals 12 can also carry payload data for communications between the aircraft 16 and the base station 14 or other network nodes in the distributed RF communications system 10. Such payload data may facilitate additional tasks, such as coordination of a formation of aircraft 16.

As illustrated in FIG. 1, the base station 14 can be a distributed base station having multiple antennas 18 to provide more accurate and/or detailed position information (e.g., in addition to range, multiple antennas can provide position and orientation estimation). Similarly, the aircraft 16 can have a multi-antenna RF transceiver. In an illustrative example, the aircraft 16 has a four-antenna transceiver and the base station 14 has three antennas 18, such that twelve RF signals 12 are exchanged between the base station 14 and the aircraft 16 to facilitate improved estimation of position information.

In an exemplary aspect, the distributed RF communications system 10 operates with a 10 megahertz (MHz) bandwidth and maintains a ranging standard deviation below 5 centimeters (cm) for up to 2 kilometers (km) of range. In controlled configurations, this deviation can be driven as low as 1 millimeter (mm). This capability is facilitated by a phase accurate time-of-arrival (ToA) estimation technique, a distributed phase-coherence algorithm, and iterative tracking of parameters using hidden Markov models, such as adaptive filtering techniques (e.g., Kalman filtering), as described further below.

It should be understood that while FIG. 1 is described with respect to aircraft 16 in particular, exemplary embodiments may include other types of RF devices, including vehicles. For example, a radio-bearing automobile in the distributed RF communications system 10 may facilitate relevant positioning tasks, such as parking, street navigation, and awareness of other vehicles for passing, accelerating, stopping, and so on. A radio-bearing ship in the distributed RF communications system 10 can facilitate relevant positioning tasks such as navigation, formation travel, collision avoidance, docking, and so on. Embodiments of the present disclosure implemented in such vehicles may be used for assisted operation, remote control, autonomous systems, and so on. In other examples, the network nodes of the distributed RF communications system 10 can include an automobile, ship, train, or other vehicle, or non-vehicular applications where position information is needed or beneficial. In some examples, one or more network nodes in the distributed RF communications system 10 is a satellite.

It should also be understood vehicles, base stations, or other network nodes in embodiments of the present disclosure can include more or fewer antennas than described above. In some embodiments, antennas may be distributed on a network node to optimize operation according to a particular application (e.g., for air-to-ground communication in the example depicted, or for ground-to-ground communication in the example of automobiles). For example, the antennas may be distributed to reduce ground bounce and/or multi-path interference of RF signals transmitted or received by the network node.

Figure 2:
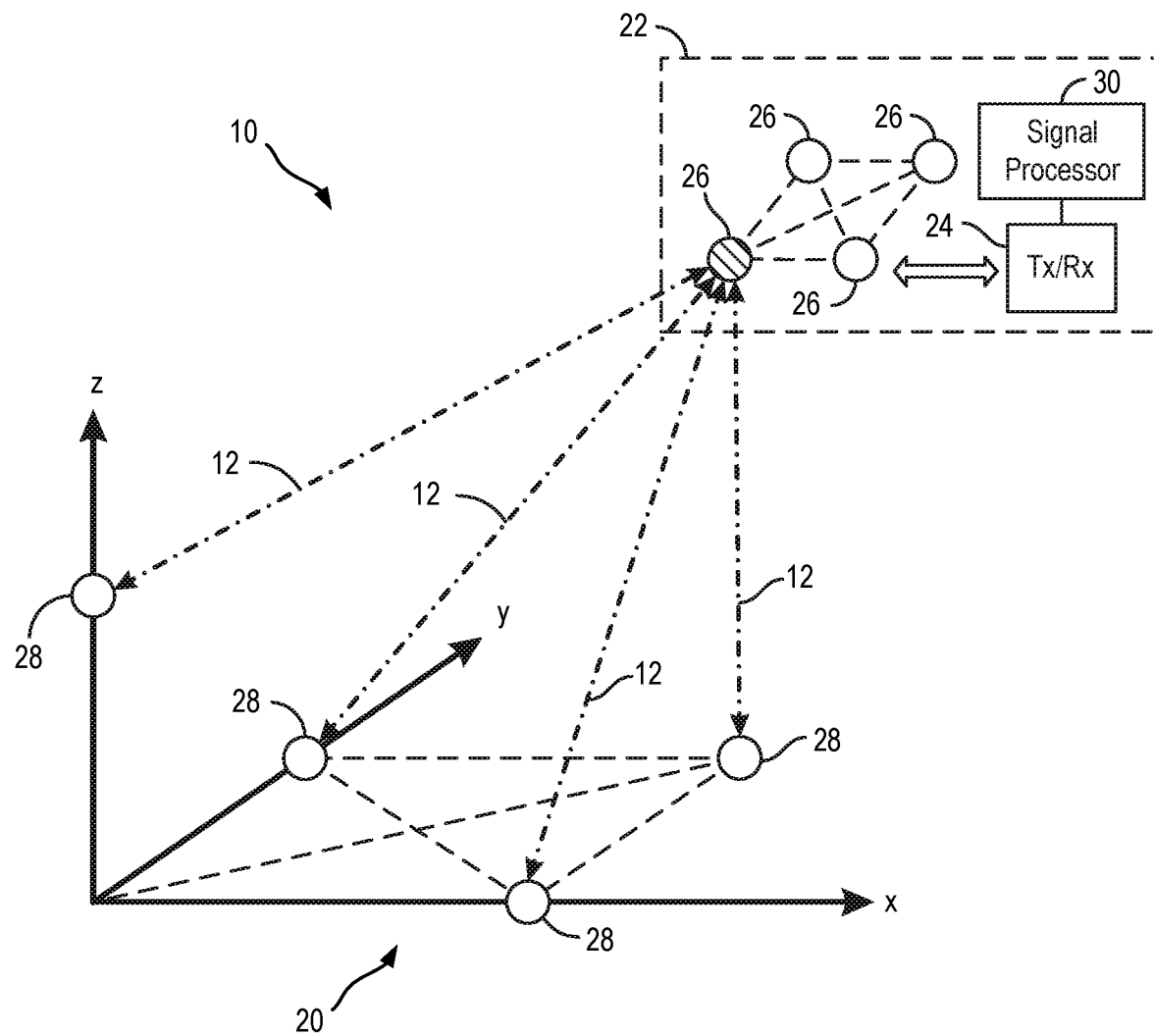
FIG. 2 is a schematic diagram of the distributed RF communications system of FIG. 1, illustrating estimation of position information based on exchanging RF signals between a first network node and a second network node.

FIG. 2 is a schematic diagram of the distributed RF communications system 10 of FIG. 1, illustrating estimation of position information based on exchanging RF signals 12 between a first network node 20 and a second network node 22. Each network node 20, 22 can be a base station (e.g., the first network node can be the base station 14 of FIG. 1) or a vehicle (e.g., the second network node can be the aircraft 16 of FIG. 1). In addition, each network node 20, 22 in the distributed RF communications system 10 can also include or be implemented as an RF device. For example, the second network node 22 includes an RF transceiver 24. The RF transceiver 24 is coupled to one or more antennas 26, through which the RF transceiver 24 can communicate wirelessly with the first network node 20 (e.g., at each of one or more antennas 28).

In an exemplary aspect, the RF transceiver 24 includes an RF receiver and an RF transmitter for communicating wirelessly over RF signals 12. In some examples, the RF transceiver 24 can communicate over cellular or non-cellular RF frequency bands, citizens broadband radio service (CBRS) frequency bands, over microwave frequency bands, over millimeter wave (mmWave) frequency bands, over terahertz frequency bands, over optical frequency bands, and so on. In some examples, the RF transceiver 24 exchanges signals having a narrow bandwidth, such as 10 MHz or less. In some examples, the RF transceiver 24 exchanges signals over a Long Term Evolution (LTE), Fifth Generation (5G), or other Third Generation Partnership Project (3GPP) cellular communication signal.

As illustrated in FIG. 2, the RF transceiver 24 can couple to an array of antennas 26. Each of the antennas 26 of the second network node 22 may exchange RF signals 12 with each of multiple antennas 28 of the first network node 20 (and additional network nodes in the distributed RF communications system 10). The second network node 22 further includes a signal processor 30 coupled to the RF transceiver 24 to process the RF signals 12 exchanged with the first network node 20. By processing the RF signals 12, the signal processor 30 can estimate position information of the second network node 22 based on relative distances between the antennas 26 of the second network node 22 and each of the antennas 28 of the first network node 20. In addition, a velocity, acceleration, range, bearing, altitude and/or orientation of the second network node 22 can be estimated based on the position information. The position information can be fused with additional information (e.g., additional information received via the distributed RF communications system 10, inertial measurement data, sensor data, GPS data) to refine the relative and/or absolute position (and/or range, velocity, acceleration, bearing, altitude, and/or orientation) of the second network node 22.

Aspects of the present disclosure describe a distributed RF communications system 10 which estimates the ToA of the RF signals 12 traveling between an antenna 26 of the second network node 22 and each antenna 28 of the first network node 20. A synchronization algorithm (e.g., distributed phase-coherence algorithm) measures time-of-flight (ToF) between all pairs of antennas 26, 28. These estimates are transformed into relative range, position, and/or orientation estimates. Parameters used in estimating the ToF, as well as the ToA, range, position, and orientation estimates are iteratively tracked and adjusted using hidden Markov models, such as adaptive filtering techniques (e.g., extended Kalman filter tracking).

Network nodes 20, 22 within this system 10 simultaneously perform communications and positioning tasks. These tasks are performed by transmitting and receiving a co-use joint positioning-communications waveform that contains both a communications payload and several positioning reference sequences. The positioning sequences are used to estimate the ToA of the received joint positioning-communications waveform. The payload contains timing information that drives a ToF estimation algorithm. By alternating between transmitting and receiving this information, two nodes are able to align their clocks and estimate their relative positions with high precision.

Figure 3A:
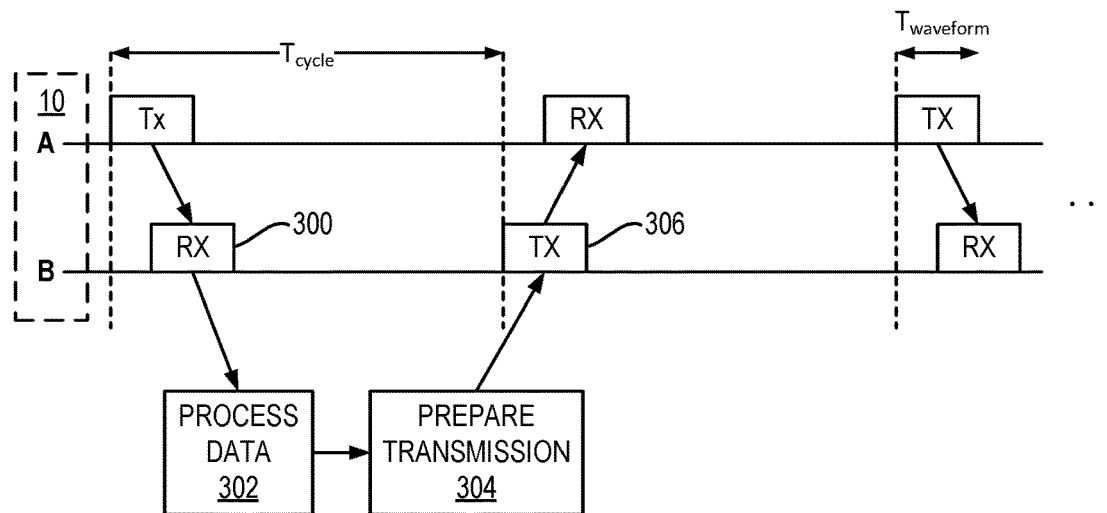
FIG. 3A is a schematic diagram of interactions between the first network node and the second network node of the distributed RF communications system of FIG. 2 over a joint positioning-communications waveform.

FIG. 3A is a schematic diagram of interactions between the first network node 20 and the second network node 22 of the distributed RF communications system 10 of FIG. 2 over a joint positioning-communications waveform. The first network node 20 (node A) and the second network node 22 (node B) alternate between transmitting and receiving periodically over the joint positioning-communications waveform. For example, at operation 300 node B receives a first RF receive signal from node A, which includes the joint positioning-communications waveform. At operation 302, node B processes the received data to produce relative positional information. This can include estimating the ToA of all positioning sequences on all receive channels and extracting timing information from a data payload of the joint positioning-communications waveform.

In some examples, to support additional network nodes in the distributed RF communications system 10 without sacrificing quality of service, spatially adaptive interference mitigation techniques may also be employed at operation 302. The multi-antenna nature of devices in the distributed RF communications system 10 affords spatial diversity that enables a variety of spatial interference mitigation techniques, as well is MIMO communication. Adaptive techniques also allow the system to adapt to network nodes entering and exiting the network, time-varying external interference, changing network environments, and evolving channels. The adaptive techniques may address the following:

1. Internal Interference: Adding network nodes to the distributed RF communications system 10 also increases the number of potential interferers that each must mitigate. Due to the cooperative nature of this system, however, successive interference cancellation (SIC) techniques are a feasible approach to interference mitigation. SIC requires that a receiver reconstructs an estimate of an interfering signal, then subtract it from the signal it originally received. Network nodes within the distributed RF communications system 10 share information about how their waveforms are built, so this reconstruction is tractable. Mutual interference may also be limited by adaptively coordinating power levels across the distributed RF communications system 10 and adaptively scheduling time and frequency slots for different network nodes.

2. External Interference: The distributed RF communications system 10 must also contend with already congested spectral environments, in which it may not have knowledge of the interferers. In this case, the spatial diversity afforded by the multi-antenna platforms may be leveraged to implement spatial beamforming, in which an antenna array is adjusted to maximize incoming energy in the direction of other network nodes and minimizing incoming energy from the interferers. This process must also be adaptive to compensate for interferers that move within the environment.

At operation 304, node B prepares a transmission, which can include assembling the estimated position information (and in some examples, some of the information from the first received signal, such as received ToA or position estimates). At operation 306, node B transmits the joint positioning-communications waveform back to node A using a second signal (e.g., a first transmit signal). In some examples, transmissions are scheduled by a master node (e.g., one of node A or node B, or another node). In some examples, the transmissions occur every 50 milliseconds (ms) (e.g., the cycle duration $T_{cycle}$ is 50 ms). In some examples, the joint positioning-communications waveform has a duration ($T_{waveform}$) of about 1 ms. This transfer of information drives the timing synchronization and ToF estimation algorithm.

Figure 3B:
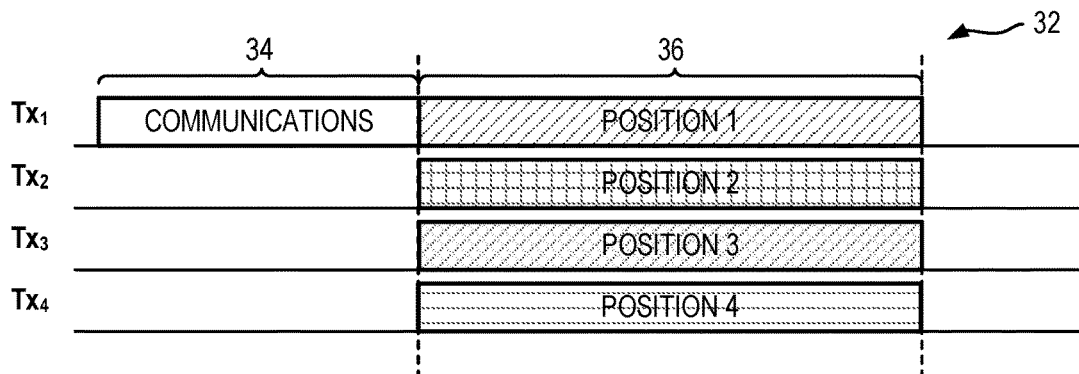
FIG. 3B is a schematic diagram of an exemplary structure of the joint positioning-communications waveform using the protocol of FIG. 3A.

FIG. 3B is a schematic diagram of an exemplary structure of a joint positioning-communications waveform 32 using the protocol of FIG. 3A. A transmission using the joint positioning-communications waveform 32 includes a communications segment 34 and a positioning segment 36. The communications segment 34 contains a data payload and several pilot sequences. In the exemplary joint positioning-communications waveform 32 of FIG. 3B, a code division duplexing (CDD) strategy is used. The CDD strategy consists of placing an orthogonal positioning waveform on each antenna ($Tx_1$, $Tx_2$, $Tx_3$, $Tx_4$) and transmitting them simultaneously.

Figure 3C:
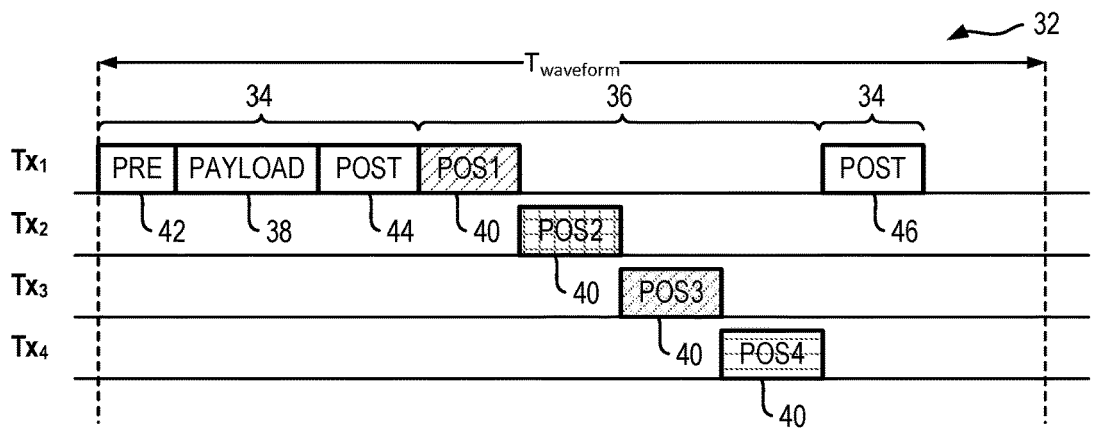
FIG. 3C is a schematic diagram of another exemplary structure of the joint positioning-communications waveform using the protocol of FIG. 3A.

FIG. 3C is a schematic diagram of another exemplary structure of the joint positioning-communications waveform 32 using the protocol of FIG. 3A. In this example, a time division duplexing (TDD) strategy is used. The TDD strategy consists of placing the same waveform on each antenna ($Tx_1$, $Tx_2$, $Tx_3$, $Tx_4$) but transmitting in different time slots. CDD allows a longer waveform which increases signal-to-noise ratio (SNR) relative to TDD, but must account for inter-symbol interference which may limit performance.

In the examples of FIGS. 3B and 3C, the joint positioning-communications waveform 32 contains a data payload 38, several positioning sequences 40 for ToA estimation, a preamble 42, and post-ambles 44, 46 for acquisition and synchronization. The illustrated structure of the joint positioning-communications waveform 32 is for a network node (e.g., the second network node 22 of FIG. 2) with 4 antennas. The first half of the joint positioning-communications waveform 32 contains the data payload 38 and supporting amble sequences 42, 44, 46. The data payload 38 can be placed between a minimum shift keying (MSK) preamble 42 and post-amble 44, which are used by the receiver to acquire and synchronize the received joint positioning-communications waveform 32. The data payload 38 can be modulated using binary phase shift keying (BPSK). A second MSK postamble 46 can be placed at the end of the joint positioning-communications waveform 32 to enable precise frequency corrections.

The second half of the joint positioning-communications waveform 32 contains the positioning sequences 40. These may be random MSK sequences that have been treated to have low cross correlation properties with each other. One positioning sequence 40 is transmitted from each transmit antenna ($Tx_1$ through $Tx_4$), following the CDD or TDD scheme. The TDD strategy can mitigate inter-symbol interference (ISI) at the receiver, which estimates the ToA of each sequence at each receive antenna. This further allows the receiver to unambiguously estimate the path length to each transmit antenna. For two 4-antenna network nodes, there are 16 transmit-receive links that can be estimated.

In an exemplary aspect, the data payload 38 includes a positional information estimate from the transmitting network node, which can include delay, offset, radial acceleration, and/or clock frequency drift estimates, as well as relative range, position, velocity, acceleration, bearing, altitude, and/or orientation estimates. In some examples, the data payload 38 includes inertial information from an inertial navigation unit (which can include fused data from an accelerometer, gyroscope, GPS device, optical data from a camera, etc.). In other examples, the data payload 38 can include distributed coherence information or beamforming information, which can be used to select antennas (e.g., where more than four antennas are available) and/or communication protocols which are best for communication and/or position estimation.

FIGS. 3B and 3C are illustrated with the communications segment 34 (including the data payload 38) transmitted from a first transmit antenna ($Tx_1$). It should be understood that embodiments of the joint positioning-communications waveform 32 can transmit portions of the communications segment 34 (e.g., portions or all of the data payload 38) from any of the transmit antennas ($Tx_1$, $Tx_2$, $Tx_3$, $Tx_4$), or combinations of the transmit antennas (including all of the transmit antennas), such as using a MIMO communication scheme.

Figure 4:
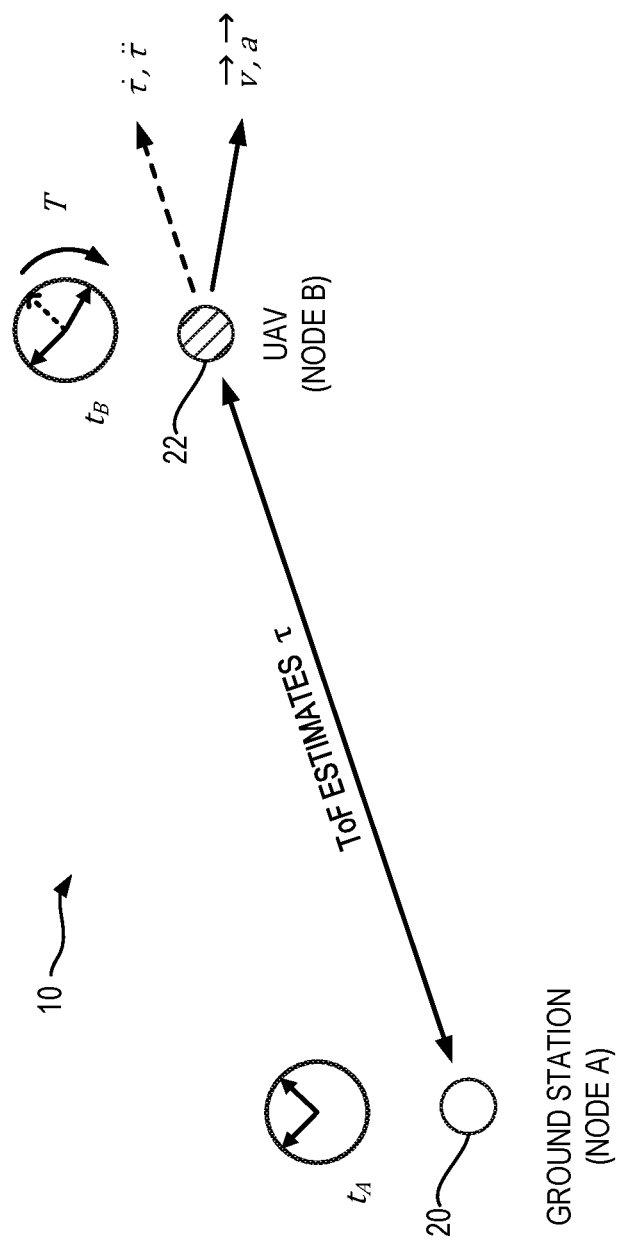
FIG. 4 is a schematic diagram of the exemplary distributed RF communications system, illustrating a clock offset between the first network node and the second network node of FIG. 2.

FIG. 4 is a schematic diagram of the exemplary distributed RF communications system 10, illustrating a clock offset between the first network node 20 (e.g., node A) and the second network node 22 (e.g., node B) of FIG. 2. For illustrative purposes, the first network node 20 (illustrated as node A) can be assumed to be stationary and tethered to the ground while the second network node 22 (illustrated as node B) is airborne, moving with a velocity $\dot{\tau}$ and acceleration $\ddot{\tau}$ in a three-dimensional Cartesian space.

Nodes A and B are driven by independent clocks and they communicate over a single-input-single-output (SISO) line-of-sight environment. The two nodes sequentially exchange communications waveforms that include transmit $t_{(\cdot),Tx}$ and receive $t_{(\cdot),Rx}$ timestamps. These timestamps are leveraged to estimate the stochastic processes, relative clock offsets (T) and propagation time (e.g., ToF ($\tau$)) between the two network nodes 20, 22. Radial velocity $\dot{\tau}$ and acceleration $\ddot{\tau}$ act along the dashed line. Proposed methods readily generalize to multiple node networks operating on multi-antenna platforms.

II. Timing Exchange Protocol

This section describes a timing exchange protocol used by embodiments of the present disclosure and corroborate its workings for the scenario depicted in FIG. 4.

A. Notation

Figure 5:
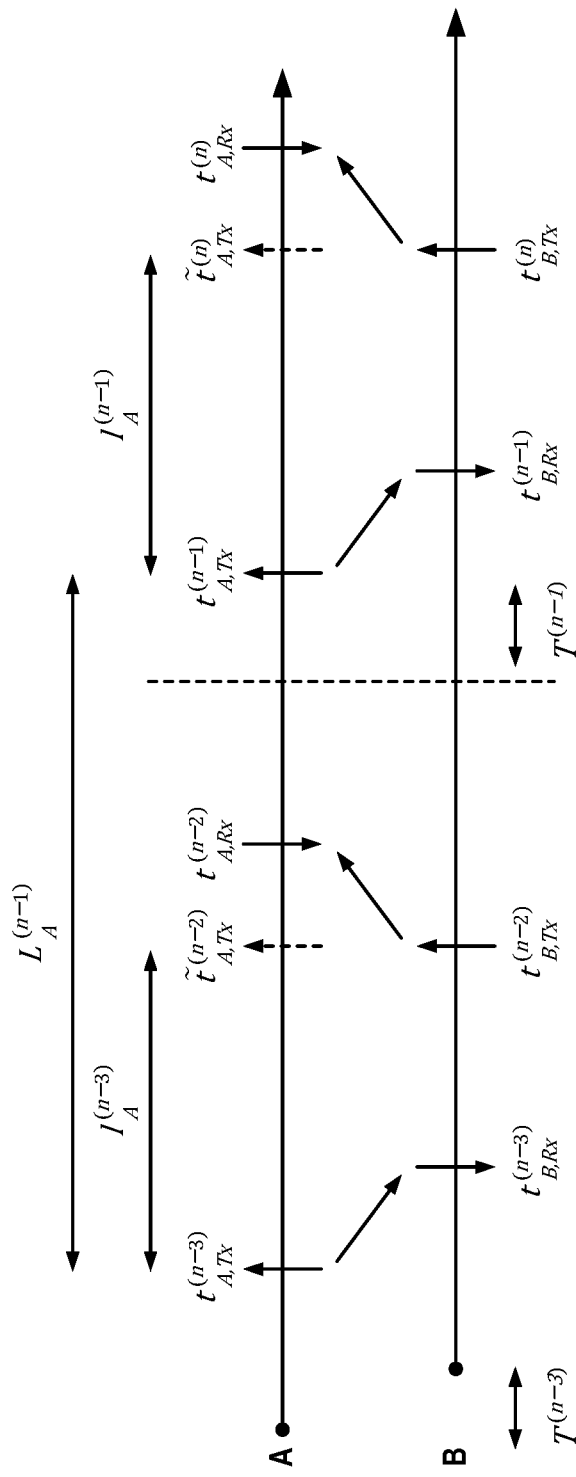
FIG. 5 is a flow diagram illustrating an exemplary timing exchange model at node A of FIG. 4 for two cycles using the joint positioning-communications waveform of FIGS. 3A-3C.

FIG. 5 is a flow diagram illustrating an exemplary timing exchange model at node A of FIG. 4 for two cycles using the joint positioning-communications waveform 32 of FIGS. 3A-3C. Each cycle can span two frames, and the cycles are separated by time $L_A$, indicated by a dashed line. Designated master node A transmits the joint positioning-communications waveform 32 to node B in the first frame, node B waits for an agreed frame separation l and transmits it back to node A during the second frame. The transmit timestamp $t_{B,Tx}^{(n)}$ is perceived by node A as $\hat{t}_{A,Tx}^{(n)}$ (shown in dashed line) and frame length l as $l_A$ due to clock offset T.

The two nodes A and B sequentially exchange timing information via the joint positioning-communications waveform, which is then translated to corresponding timestamps using phase-accurate ToA estimation methods. These timestamps are denoted by $t_{(\cdot)(\cdot)}^{(\cdot)}$; the first subscript indicates the node at which the event occurs and the second subscript indicates if it was a transmit or receive event and the superscript is an indication of the frame during which the event occurs. The transmit timestamps are assumed to be known with certainty while the receive timestamps are a result of phase-accurate ToA estimation, hence represented as $\hat{t}_{(\cdot),Rx}^{(\cdot)}$. Two successive frames comprise a cycle that is $L^{(\cdot)}$ seconds (s) long and is represented as $\{(k), (k+1)\}$ where the successive frames (k) and (k+1) are $l^{(\cdot)}$ s apart. Despite scheduling, the nodes disagree on time hence making frame length dependent on the evaluating node $l_A^{(\cdot)}$ or $l_B^{(\cdot)}$. All essential notations are delineated in the Table I.

TABLE I

Terminology pertaining to timing exchange protocol at a given instance of time indicated by the superscript.
Timing Model Notation

| | |
|---|---|
| $t_{A,Tx}^{(\cdot)}$ | Transmit event timestamp at node A |
| $\hat{t}_{A,Rx}^{(\cdot)}$ | Receive event timestamp at node A |
| $t_{B,Tx}^{(\cdot)}$ | Transmit event timestamp at node B |
| $\hat{t}_{B,Rx}^{(\cdot)}$ | Receive event timestamp at node B |
| $\hat{t}_{A,Tx}^{(\cdot)}$ | Perceived event timestamp at node B by A |
| $l_A^{(\cdot)}$ | Perceived frame length l by node A |
| $L_A^{(\cdot)}$ | Perceived cycle length L by node A |
| $\hat{\tau}^{(\cdot)}$ | Relative ToF between nodes A and B |
| $\hat{\dot{\tau}}^{(\cdot)}$ | Relative radial velocity between nodes A and B |
| $\hat{\ddot{\tau}}^{(\cdot)}$ | Relative radial acceleration between nodes A and B |
| $\hat{T}^{(\cdot)}$ | Relative time offset between clocks A and B |
| $\hat{f}^{(\cdot)}$ | Relative frequency offset between clocks A and B |
| $\hat{\dot{f}}^{(\cdot)}$ | Relative frequency drift between clocks A and B |

B. Formulation

During a cycle $\{(n-1), (n)\}$, designated master node A transmits a communication packet to node B in the first frame (n−1), node B waits for an agreed frame separation l and transmits a packet to node A during the second frame (n) as depicted in FIG. 5. Each packet comprises a transmit timestamp $t_{(\cdot),Tx}$ of the transmitting node along with communication payload. Exemplary embodiments are concerned with estimating clock offset (T) and relative ToF ($\tau$) between the two nodes for the cycle containing $(n-1)^{th}$ and $(n)^{th}$ frames while making an assumption that estimates of these parameters for previous cycles are available.

For a transmission from node A to node B, during frame (n−1), node B will receive the signal at time:

$$\hat{t}_{B,Rx}^{(n-1)} = t_{A,Tx}^{(n-1)} + \hat{\tau}^{(n-1)} - \hat{T}^{(n-1)} \qquad \text{Equation 1}$$

whereas a transmission from node B to node A, during frame (n), node A will receive the signal at time:

$$\hat{t}_{A,Rx}^{(n)} = t_{B,Tx}^{(n)} + \hat{\tau}^{(n)} - \hat{T}^{(n)} \qquad \text{Equation 2}$$

The two radios nodes A and B are required to transmit every frame separated by l. However, oscillator offset and drifts within the radios force the frame length l to be time dependent and different for each node. Therefore, the transmit timestamp $t_{B,Tx}^{(n)}$ is perceived by node A as $\hat{t}_{A,Tx}^{(n)}$ due to clock discrepancies:

$$\hat{t}_{A,Tx}^{(n)} = t_{B,Tx}^{(n)} + \hat{T}^{(n)} \qquad \text{Equation 3}$$

Also, frame length l measures to $l_A$ and cycle separation L to $L_A$ respectively on clock driving node A, which for the current cycle of interest become:

$$\hat{l}_A^{(n-1)} = \hat{t}_{A,Tx}^{(n)} - t_{A,Tx}^{(n-1)} \qquad \text{Equation 4}$$

$$L_A^{(n-1)} = t_{A,Tx}^{(n-1)} - t_{A,Tx}^{(n-3)} \qquad \text{Equation 5}$$

These formulations are used herein to aid delay and offset estimation.

III. Tracking Algorithm

In an exemplary aspect, one or more of the parameters described above is iteratively tracked and used to improve position information estimates. In some embodiments, modifications are made to the extended Kalman filter (EKF) algorithm to fit the constraints posed by the current problem. As a consequence, the workings of the tracking method are recognized and required terminology and equations are presented. EKF is a non-linear variant of the Kalman family that approximates non-linear problems to linear ones using Taylor's expansion.

It should be understood that iterative tracking approaches used by embodiments described herein are not limited to EKF. Iterative tracking includes any hidden Markov model, such as linear or non-linear adaptive filtering (e.g., EKF and other Kalman filtering techniques, particle filtering techniques, etc.), stochastic approximation, adaptive estimation, and so on.

As suggested earlier, enough information to jointly estimate the parameters of interest are accrued only every cycle. An exemplary aspect deploys tracking once every cycle and extrapolates these results to derive estimates for both the corresponding frames. The Kalman filtering method can be visualized as a two-step algorithm—1) Prediction and 2) Correction.

The prediction step includes the following array of predictions made based on the assumed models on transition of state and measurement parameters in time along with their error metrics. State space parameters at time instance (n-1) are predicted as $\hat{x}_{(-)}^{(n-1)}$ using estimates from previous cycle $\hat{x}^{(n-3)}$ as:

$$\hat{x}_{(-)}^{(n-1)} = F(L_A^{(n-1)})\hat{x}^{(n-3)} + w^{(n-1)} \qquad \text{Equation 6}$$

where F(•) is the linear state transition function, $L_A^{(•)}$ is the cycle length computed using Equation 5 and $w^{(n-1)}$ is the Gaussian perturbation in state parameters such that $w^{(n-1)} \sim N(0, Q^{(n-1)})$ where $Q^{(n-1)}$ is the known state noise covariance matrix.

The error covariance matrix of the state parameters, $\hat{P}_{(-)}^{(n-1)}$ is predicted as follows:

$$\hat{P}_{(-)}^{(n-1)} = F(L_A^{(n-1)})\hat{P}^{(n-3)}F(L_A^{(n-1)})^T + Q^{(n-1)} \qquad \text{Equation 7}$$

where $\hat{P}^{(n-3)}$ is the estimated covariance matrix from previous cycle {(n−3), (n−2)} at frame (n−3). The measurement space is predicted using the state parameter predictions as follows:

$$\hat{z}_{(-)}^{(n-1)} = u^{(n-1)} + h(\hat{x}_{(-)}^{(n-1)}) + v^{(n-1)} \qquad \text{Equation 8}$$

where $u^{(•)}$ are control parameters, h(•) is the non-linear measurement transition function and $v^{(•)}$ is the Gaussian perturbation in measurements such that $v^{(n-1)} \sim \mathcal{N}(0, R^{(n-1)})$ where $R^{(n-1)}$ is the known measurement noise covariance matrix.

Kalman ideology relies on Gaussianity of the state and measurement transitions in time which is violated by non-linear transition functions. EKF algorithms combat this issue and ensure Gaussianity by linearizing the non-linear measurement transition function h(•) by computing Jacobian at predicted state space, hence called local linearization:

$$H^{(n-1)} = \left.\frac{\partial h(\hat{x})}{\partial \hat{x}}\right|_{\hat{x}_{(-)}^{(n-1)}} \qquad \text{Equation 9}$$

where now H• is the acting measurement transition function, the linearity of which enables the rest of the Kalman method.

Since this translation of non-linear function to a linear one is not necessarily optimal, the EKF does not guarantee optimality, which is inherent to the linear Kalman filter algorithm. Equation 9 is utilized to predict the error covariance matrix in measurements as follows:

$$\hat{S}_{(-)}^{(n-1)} = H^{(n-1)}\hat{P}_{(-)}^{(n-1)}H^{(n-1)T} + R^{(n-1)} \qquad \text{Equation 10}$$

Using these predictions, the state space variables are corrected by evaluating a weighted sum of state predictions and deviation of measurement predictions from observations. To do so, the 'weight' termed Kalman gain $\hat{K}^{(•)}$ is first determined for the frame of interest as:

$$\hat{K}^{(n-1)} = \hat{P}_{(-)}^{(n-1)}H^{(n-1)T}(\hat{S}_{(-)}^{(n-1)})^{-1} \qquad \text{Equation 11}$$

using which the following corrections can be made:

$$\hat{x}^{(n-1)} = \hat{x}_{(-)}^{(n-1)} + \hat{K}^{(n-1)}(z^{(n-1)} - \hat{z}_{(-)}^{(n-1)})^{-1} \qquad \text{Equation 12}$$

$$\hat{P}^{(n-1)} = (I_{n_x} - \hat{K}^{(n-1)}H^{(n-1)})\hat{P}_{(-)}^{(n-1)} \qquad \text{Equation 13}$$

where $n_x$ is the number of state parameters currently being tracked.

These estimates $\hat{x}^{(n-1)}$ are then interpolated to obtain state space estimates for the frame (n) using the following equations:

$$\hat{\tau}^{(n)} = \hat{\tau}^{(n-1)} + f(\hat{\tau}^{(n-1)}, \hat{\tau}^{(n-1)}, \hat{l}_A^{(n-1)}) \qquad \text{Equation 14}$$

$$\hat{T}^{(n)} = \hat{T}^{(n-1)} + g(\hat{T}^{(n-1)}, \hat{T}^{(n-1)}, \hat{l}_A^{(n-1)}) \qquad \text{Equation 15}$$

where the functions f(•) and g(•) rely on the Markov model assumptions and $\hat{l}_A^{(•)}$ is the estimated frame length for the current time instance by the corresponding estimator. This construction proves useful for the following estimators and tracking algorithms in identifying commonalities among them.

Algorithm I: Extended Kalman filter algorithm
adopted for this disclosure
Algorithm I: Modified Extended Kalman Filter Tracking Algorithm

| | |
|---|---|
| Input: | $\hat{x}^{(n-1)}, \hat{P}^{(n-3)}, Q^{(n-1)}, z^{(n-1)}, R^{(n-1)}$ |
| Output: | $\hat{x}^{(n-1)}, \hat{P}^{(n-1)}$ |
| 1. | Predict state parameters at frame (n − 1) using Eq. 6 |
| $F^{(k)}$ | State Transition Matrix at k |
| $\hat{P}_{(-)}^{(k)}$ | Predicted State Covariance Matrix at k |
| $Q^{(k)}$ | State Noise Covariance Matrix at k |
| $\hat{z}_{(-)}^{(k)}$ | Predicted Measurement at k |

-continued

| Algorithm I: Extended Kalman filter algorithm adopted for this disclosure Algorithm I: Modified Extended Kalman Filter Tracking Algorithm | |
|---|---|
| h | Measurement Transition Matrix |
| $H^{(k)}$ | Jacobian of h computed at $\hat{x}_{(-)}^{(k)}$ |
| $R^{(k)}$ | Measurement Noise Covariance Matrix at k |
| $K^{(k)}$ | Kalman Gain at k |
| $\hat{x}^{(k)}$ | State Estimate at k |
| $\hat{P}^{(k)}$ | State Covariance Matrix Estimate at k |

Figure 6:
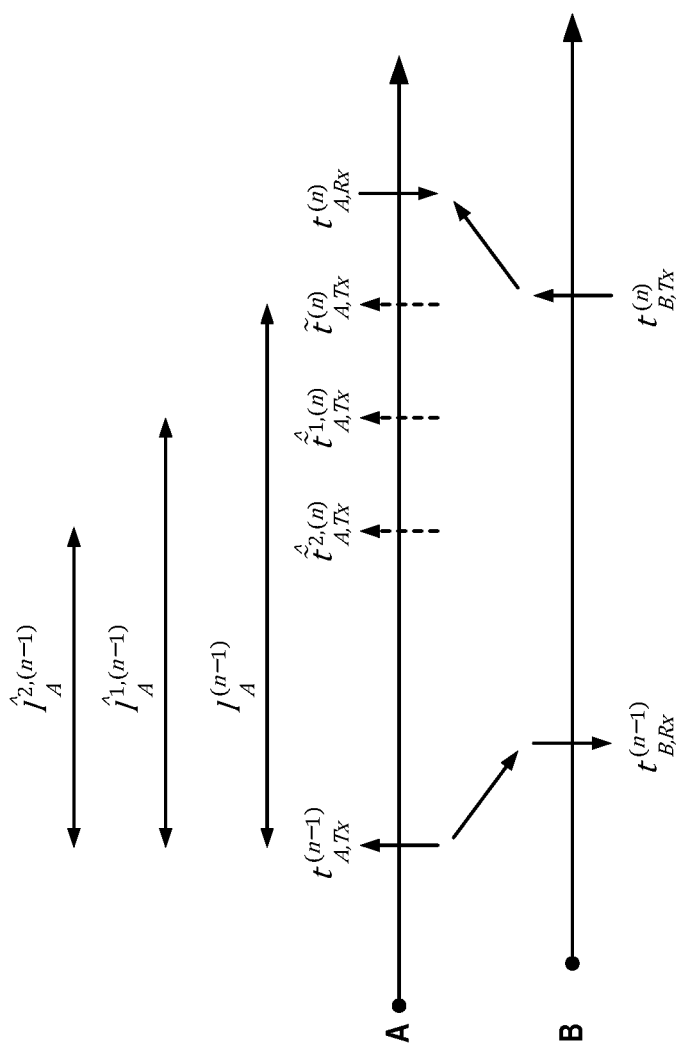
FIG. 6 is a flow diagram illustrating the timing exchange model of FIG. 5 at node A of FIG. 4 for two frames, referenced with respect to first and second order models of estimation and tracking.

FIG. 6 is a flow diagram illustrating the timing exchange model of FIG. 5 at Node A of FIG. 4 for two frames, referenced with respect to first and second order models of estimation and tracking. The transmit timestamp $t_{B,Tx}^{(n)}$ is perceived by node A as $\hat{t}_{A,Tx}^{(n)}$ and frame length l as $\hat{l}_A^{(n-1)}$ due to clock offset T. The proposed methods estimate these parameters as $\hat{\tilde{t}}_{B,Tx}^{i,(n)}$ and $\hat{l}_A^{i,(n-1)}$ where i indicates the different methods whose estimates are shown in FIG. 6.

IV. Joint Delay-Offset Estimation and Tracking—First Order

Joint efforts are studied towards synchronizing clocks on the two nodes A and B, alongside estimating relative ranging between them, under the assumption that the delay τ and offset T follow first order Markov models. EKF tracking methods that keep with a joint delay-offset estimator to track the delay and offset estimates in time along with other parameters of interest.

A. Estimation

It is assumed that relative propagation delay τ and clock time offset T between two nodes A and B follow a Markov model. This implies that node B moves with constant radial velocity $\dot{\tau}$ and the clocks on the two radios have constant relative frequency offset $\dot{T}$. During the two-way cycle {(n-1), (n)}, delay and offset estimates for the $(n)^{th}$ frame rely on that of frame (n-1) as follows:

$$\hat{\tau}^{(n)} = \hat{\tau}^{(n-1)} + \hat{\dot{\tau}}^{(n-1)} \hat{l}_A^{(n-1)} \qquad \text{Equation 16}$$

$$\hat{T}^{(n)} = \hat{T}^{(n-1)} + \hat{\dot{T}}^{(n-1)} \hat{l}_A^{(n-1)} \qquad \text{Equation 17}$$

where $\hat{l}_A^{(n-1)}$ is the separation between the two frames, therefore Equations 1 and 2 become:

$$\hat{t}_{B,Rx}^{(n-1)} = t_{A,Tx}^{(n-1)} + \hat{\tau}^{(n-1)} - \hat{T}^{(n-1)} \qquad \text{Equation 18}$$

$$\hat{t}_{A,Rx}^{(n)} = t_{B,Tx}^{(n)} + \hat{\tau}^{(n)} + \hat{\dot{\tau}}^{(n-1)} \hat{l}_A^{(n-1)} + \hat{T}^{(n-1)} + \hat{\dot{T}}^{(n-1)} \hat{l}_A^{(n-1)} \qquad \text{Equation 19}$$

The transmit timestamp during the frame (n), $t_{B,Tx}^{(n)}$ is perceived by node A as $\hat{t}_{A,Tx}^{(n)} = t_{B,Tx}^{(n)} + \hat{T}^{(n-1)} + \hat{\dot{T}}^{(n-1)} \hat{l}_A^{(n-1)}$ (see Equation 3) and is estimated as:

$$\hat{t}_{A,Tx}^{(n)} = \frac{t_{B,Rx}^{(n-1)} + \hat{T}^{(n-1)} - \hat{\dot{T}}^{(n-1)} t_{A,Tx}^{(n-1)}}{1 - \dot{T}(n-1)} \qquad \text{Equation 20}$$

by substituting for $\hat{l}_A^{(n-1)}$ from Equation 4. Using the same the frame separation between the two frames (n-1) and (n) is estimated as:

$$\hat{l}_A^{1,(n-1)} = \frac{t_{B,Tx}^{(n-1)} + t_{A,Tx}^{(n-1)} - \hat{T}^{(n-1)}}{1 - \hat{\dot{T}}^{(n-1)}} \qquad \text{Equation 21}$$

The relative radial velocity $\hat{\dot{\tau}}^{(n-1)}$ and frequency offset $\hat{\dot{T}}^{(n-1)}$ are computed using delay and offset estimates from previous cycle {(n-3), (n-2)} as follows:

$$\hat{\dot{\tau}}^{(n-1)} = \frac{\hat{\tau}^{(n-1)} - \hat{\tau}^{(n-3)}}{L_A^{(n-1)}} \qquad \text{Equation 22}$$

$$\hat{\dot{T}}^{(n-1)} = \frac{\hat{T}^{(n-1)} - \hat{T}^{(n-3)}}{L_A^{(n-1)}} \qquad \text{Equation 23}$$

where $L_A^{(n-1)} = t_{A,Tx}^{(n-1)} - t_{A,Tx}^{(n-3)}$ is the cycle separation between the two corresponding cycles. With the help of Equations 21-23, Equations 18 and 19 can be reduced to a system of linear equations in $\hat{\tau}^{(n-1)}$ and $\hat{T}^{(n-1)}$ as depicted below:

$$\hat{\tau}^{(n-1)} - \hat{T}^{(n-1)} = \hat{\delta}^{(n-1)} \qquad \text{Equation 24}$$

$$\hat{\varepsilon}^{(n-1)} \hat{\tau}^{(n-1)} + \hat{\zeta}^{(n-1)} \hat{T}^{(n-1)} = \hat{\eta}^{(n-1)} \qquad \text{Equation 25}$$

where $$\hat{\delta}^{(n-1)} = \hat{t}_{B,Tx}^{(n-1)} - t_{A,Tx}^{(n-1)} \qquad \text{Equation 26}$$

$$\hat{\varepsilon}^{(n-1)} = L_A^{(n-1)} + t_{B,Tx}^{(n)} - t_{A,Tx}^{(n-1)} + \hat{T}^{(n-3)} \qquad \text{Equation 27}$$

$$\hat{\zeta}^{(n-1)} = L_A^{(n-1)} + \hat{t}_{A,Rx}^{(n)} - t_{A,Tx}^{(n-1)} + \hat{\tau}^{(n-3)} \qquad \text{Equation 28}$$

$$\hat{\eta}^{(n-1)} = \hat{t}_{A,Rx}^{(n)}(\hat{T}^{(n-3)} + L_A^{(n-1)}) + t_{B,Tx}^{(n)}(\hat{\tau}^{(n-3)} - L_A^{(n-1)}) - t_{A,Tx}^{(n-1)}(\hat{\tau}^{(n-3)} + \hat{T}^{(n-3)}) \qquad \text{Equation 29}$$

The ToF and clock offset estimates at node A ($\hat{\tau}^{(n-1)}$ and $\hat{T}^{(n-1)}$) are therefore obtained by Equations 24 and 25:

$$\hat{\tau}^{(n-1)} = \frac{\hat{\eta}^{(n-1)} + \hat{\zeta}^{(n-1)} \hat{\delta}^{(n-1)}}{\hat{\varepsilon}^{(n-1)} + \hat{\zeta}^{(n-1)}} \qquad \text{Equation 30}$$

$$\hat{T}^{(n-1)} = \frac{\hat{\eta}^{(n-1)} - \hat{\varepsilon}^{(n-1)} \hat{\delta}^{(n-1)}}{\hat{\varepsilon}^{(n-1)} + \hat{\zeta}_A^{(n-1)}} \qquad \text{Equation 31}$$

These results are extended to estimate $\hat{\dot{\tau}}^{(n-1)}$ and $\hat{\dot{T}}^{(n-1)}$ using Equations 22 and 23. Also, delay and time offset estimates for $(n)^{th}$ frame, $\hat{\tau}^{(n)}$ and $\hat{T}^{(n)}$ respectively, are extrapolated using Equations 16 and 17 where $\hat{l}_A^{(n-1)}$ is estimated as $\hat{l}_A^{(n-1)}$ using Equation 21.

B. Tracking

All the assumptions necessary to enable joint tracking of relative clock offset T and time-of-flight τ between two nodes A and B are established. In addition, the previously considered equations are reformulated to fit the Kalman filter ideology for the first order Markov model assumption.

1. State Transition

As mentioned above, constant velocity and frequency offset between the two radio platforms is assumed. The state space model, under current scenario, at instance (n-1) is as follows:

$$\hat{x}_{(-)}^{(n-1)} = F(L_A^{(n-1)}) \hat{x}^{(n-3)} + w^{(n-1)} \qquad \text{Equation 32}$$

where $\hat{x}^{(k)}$ are state space variable estimates, when subscripted with (−) denotes predictions, F(•) is the linear state transition matrix at frame indicated by (k):

$$\hat{x}^{(k)} = \begin{bmatrix} \hat{\tau}^{(k)} \\ \hat{\dot{\tau}}^{(k)} \\ \hat{T}^{(k)} \\ \hat{\dot{T}}^{(k)} \end{bmatrix}, F(L_A^{(k)}) = \begin{bmatrix} 1 & L_A^{(k)} & 0 & 0 \\ 0 & 1 & 0 & 0 \\ 0 & 0 & 1 & L_A^{(k)} \\ 0 & 0 & 0 & 1 \end{bmatrix} \quad \text{Equation 33}$$

and the separation $L_A^{(k)}$ is evaluated every cycle (see Equation 5). $w^{(k)} \sim \mathcal{N}(0, Q^{(k)})$ is a Gaussian perturbation in the model and $Q^{(k)}$ is the state space noise covariance matrix with the following structure:

$$Q^{(k)} = \text{diag}(Q_\tau^{(k)}, Q_T^{(k)}) \text{ where} \quad \text{Equation 34}$$

$$Q_\tau^{(k)} = \begin{bmatrix} \frac{1}{2}\sigma_{\dot{\tau}}^2 L_A^{(k)2} & \sigma_{\dot{\tau}}^2 L_A^{(k)} \\ \sigma_{\dot{\tau}}^2 L_A^{(k)} & \sigma_{\dot{\tau}}^2 \end{bmatrix} \quad \text{Equation 35}$$

$$Q_T^{(k)} = \begin{bmatrix} \sigma_{\dot{T}}^2 L_A^{(k)} + \frac{1}{3}\sigma_{\dot{T}}^2 L_A^{(k)3} & \frac{1}{2}\sigma_{\dot{T}}^2 L_A^{(k)2} \\ \frac{1}{2}\sigma_{\dot{T}}^2 L_A^{(k)2} & \sigma_{\dot{T}}^2 L_A^{(k)} \end{bmatrix} \quad \text{Equation 36}$$

where $Q_\tau^{(\cdot)}$ follows from a Gaussian velocity perturbation model and $Q_T^{(k)}$ is the result of a two state clock error model.

2. Measurement Transition

The ToA estimates deduced via the two-way timing exchange serve as measurements for this Kalman filter set-up. Following Equations 18 and 19, the measurement transition model becomes:

$$\hat{z}_{(-)}^{(n-1)} = u^{(n-1)} + h(\hat{x}_{(-)}^{(n-1)}) + v^{(n-1)} \quad \text{Equation 37}$$

where $\hat{z}^{(k)}$ are the measurements, $u^{(k)}$ is the control vector at $(k)^{th}$ frame, subscript $(-)$ indicates prediction:

$$\hat{Z}^{(n-1)} = \begin{bmatrix} \hat{t}_{B,Rx}^{(n-1)} \\ \hat{t}_{A,Rx}^{(n)} \end{bmatrix}, u^{(n-1)} = \begin{bmatrix} t_{A,Tx}^{(n-1)} \\ t_{B,Tx}^{(n)} \end{bmatrix} \quad \text{Equation 38}$$

$h(\cdot)$ is the transition function as depicted below at frame (k).

$$h(\hat{x}_{(-)}^{(n-1)}) = \begin{bmatrix} \hat{\tau}^{(k)} - \hat{T}^{(k)} \\ \hat{\tau}^{(k)} + \hat{\dot{\tau}}^{(k)}\hat{l}_A^{1,(\cdot)} + \hat{T}^{(k)} + \hat{\dot{T}}^{(k)}\hat{l}_A^{1,(\cdot)} \end{bmatrix} \quad \text{Equation 39}$$

where $\hat{l}_A^{1,(\cdot)}$ is the first order estimate of frame length derived in Equation 21. $v^{(k)} \sim \mathcal{N}(0, R^{(k)})$ is a Gaussian perturbation in the observation model and $R^{(k)}$ is the measurement covariance matrix:

$$R^{(k)} = \text{diag}(\sigma_{t_{A,Rx}}^2, \sigma_{t_{B,Rx}}^2) \quad \text{Equation 40}$$

where the variances $\sigma_{t_{A,Rx}}^2$ and $\sigma_{t_{B,Rx}}^2$ can be deduced by analyzing precision in estimating ToA exhibited by the joint positioning-communications system at a given signal-to-noise ratio (SNR).

It is evident that the measurement transition is a non-linear function in state space predictions. Hence an EKF algorithm is used that linearizes $h(\cdot)$ using Jacobian H, derived as follows:

$$H^{(n-1)} = \frac{\partial h(\hat{x})}{\partial \hat{x}} \bigg|_{\hat{x}_{(-)}^{(n-1)}} \quad \text{Equation 41}$$

$$= \begin{bmatrix} \frac{\partial h(\hat{x})}{\partial \hat{\tau}} & \frac{\partial h(\hat{x})}{\partial \hat{\dot{\tau}}} & \frac{\partial h(\hat{x})}{\partial \hat{T}} & \frac{\partial h(\hat{x})}{\partial \hat{\dot{T}}} \end{bmatrix} \bigg|_{\hat{x}_{(-)}^{(n-1)}} \quad \text{Equation 42}$$

where:

$$\frac{\partial h(\hat{x})}{\partial \hat{\tau}} \bigg|_{\hat{x}_{(-)}^{(n-1)}} = \begin{bmatrix} 1 \\ 1 \end{bmatrix} \quad \text{Equation 43}$$

$$\frac{\partial h(\hat{x})}{\partial \hat{\dot{\tau}}} \bigg|_{\hat{x}_{(-)}^{(n-1)}} = \begin{bmatrix} 0 \\ \frac{t_{B,Tx}^{(n)} - t_{A,Tx}^{(n-1)} + \hat{T}^{(n-1)}}{1 - \hat{\dot{T}}^{(n-1)}} \end{bmatrix} \quad \text{Equation 44}$$

$$\frac{\partial h(\hat{x})}{\partial \hat{T}} \bigg|_{\hat{x}_{(-)}^{(n-1)}} = \begin{bmatrix} -1 \\ \frac{1 + \hat{\dot{\tau}}^{(n-1)}}{1 - \hat{\dot{T}}^{(n-1)}} \end{bmatrix} \quad \text{Equation 45}$$

$$\frac{\partial h(\hat{x})}{\partial \hat{\dot{T}}} \bigg|_{\hat{x}_{(-)}^{(n-1)}} = \begin{bmatrix} 0 \\ \frac{(1 + \hat{\dot{\tau}}^{(n-1)})(t_{B,Tx}^{(n)} - t_{A,Tx}^{(n-1)} + \hat{T}^{(n-1)})}{(1 - \hat{\dot{T}}^{(n-1)})^2} \end{bmatrix} \quad \text{Equation 46}$$

Based on given models, the filtering algorithm tracks $\hat{\tau}^{(n-1)}$, $\hat{\dot{\tau}}^{(n-1)}$, $\hat{T}^{(n-1)}$, $\hat{\dot{T}}^{(n-1)}$ which are then extrapolated to obtain estimates at $(n)^{th}$ frame:

$$\hat{\tau}^{(n)} = \hat{\tau}^{(n-1)} + \hat{\dot{\tau}}^{(n-1)}\hat{l}_A^{1,(n-1)} \quad \text{Equation 47}$$

$$\hat{T}^{(n)} = \hat{T}^{(n-1)} + \hat{\dot{T}}^{(n-1)}\hat{l}_A^{1,(n-1)} \quad \text{Equation 48}$$

and for the first order models:

$$\hat{\dot{\tau}}^{(n)} = \hat{\dot{\tau}}^{(n-1)}, \hat{\dot{T}}^{(n)} = \hat{\dot{T}}^{(n-1)} \quad \text{Equation 49}$$

V. Joint Delay-Offset Estimation and Tracking—Second Order

This section is interested in joint clock synchronization and relative ranging estimation between the network nodes A and B, under the assumption that the delay τ and offset T follow second order Markov models. Unlike the methods with first order assumptions, extension to second order allows for considering realistic clock models while formulating these techniques. The second order joint delay-offset estimation also reduces to solving a system of linear equations for the given scenario. An EKF tracking method is derived based on the insights gained through formulating the estimator.

A. Estimation

In this section, the assumption of constant radial velocity flight path of node B relative to node A and constant frequency offset between the two clocks considered in the previous section are relaxed. Here, the models are extended to include realistic flight paths with relative radial acceleration Y and clocks that exhibit frequency drift $\ddot{T}$. During the two-way cycle {(n−1), (n)}, delay and offset estimates for the (n)$^{th}$ frame rely on that of frame (n−1) as follows:

$$\hat{\tau}^{(n)} = \hat{\tau}^{(n-1)} + \hat{\dot{\tau}}^{(n-1)} \hat{l}_A^{(n-1)} + \tfrac{1}{2} \hat{\ddot{\tau}}^{(n-1)} \hat{l}_A^{(n-1)2} \qquad \text{Equation 50}$$

$$\hat{T}^{(n)} = \hat{T}^{(n-1)} + \hat{\dot{T}}^{(n-1)} \hat{l}_A^{(n-1)} + \tfrac{1}{2} \hat{\ddot{T}}^{(n-1)} \hat{l}_A^{(n-1)2} \qquad \text{Equation 51}$$

which then transforms Equations 1 and 2 to:

$$\hat{t}_{B,Rx}^{(n-1)} = t_{A,Tx}^{(n-1)} + \hat{\tau}^{(n-1)} + \hat{T}^{(n-1)} \qquad \text{Equation 52}$$

$$\hat{t}_{A,Rx}^{(n)} = t_{B,Tx}^{(n)} + \hat{\tau}^{(n-1)} - \hat{T}^{(n-1)} + \hat{\dot{\tau}}^{(n-1)} \hat{l}_A^{(n-1)} + \hat{\ddot{\tau}}^{(n-1)} \hat{l}_A^{(n-1)2} + \hat{\dot{T}}^{(n-1)} \hat{l}_A^{(n-1)} + \hat{\ddot{T}}^{(n-1)} \hat{l}_A^{(n-1)2} \qquad \text{Equation 53}$$

The transmit timestamp $t_{B,Tx}^{(n)}$ is perceived by node A as $\hat{\tilde{t}}_{A,Tx}^{(n)} = t_{B,Tx}^{(n)} + \hat{T}^{(n-1)} + \hat{\dot{T}}^{(n-1)} \hat{l}_A^{(n-1)} + \hat{\ddot{T}}^{(n-1)} \hat{l}_A^{(n-1)2}$ which implies that when substituting for $\hat{l}_A^{(n-1)}$ from Equation 4 results in a quadratic equation:

$$\tfrac{1}{2} \hat{\alpha}^{(n-1)} \hat{l}_A^{(n-1)2} - \hat{\beta}^{(n-1)} \hat{l}_A^{(n-1)} + \hat{\gamma}^{(n-1)} = 0 \qquad \text{Equation 54}$$

where $$\hat{\alpha}^{(n-1)} = \hat{\ddot{T}}^{(n-1)}; \hat{\beta}^{(n-1)} = 1 - \hat{\dot{T}}^{(n-1)} \qquad \text{Equation 55}$$

$$\hat{\gamma}^{(n-1)} = \hat{T}^{(n-1)} + t_{B,Tx}^{(n)} - t_{A,Tx}^{(n-1)} \qquad \text{Equation 56}$$

This can be validated by setting $\hat{\ddot{T}}^{(n-1)} = 0$; the estimated frame length $\hat{l}_A^{(n-1)}$ reduces to Equation 21 derived for the first order model. A feasible and possible solution to this quadratic equation, for any reasonable set of parameters, which exists if and only if $\hat{\beta}^{(n-1)2} - 2\hat{\alpha}^{(n-1)} \hat{\gamma}^{(n-1)} \geq 0$, is:

$$\hat{l}_A^{2,(n-1)} = \frac{\hat{\beta}^{(n-1)} - \sqrt{\hat{\beta}^{(n-1)2} - 2\hat{\alpha}^{(n-1)} \hat{\gamma}^{(n-1)}}}{\hat{\alpha}^{(n-1)}} \qquad \text{Equation 57}$$

Here, for the second order models, $\hat{\tau}^{(n-1)}$ and $\hat{T}^{(n-1)}$ are derived from Equation 22 and Equation 23 respectively, whereas the relative acceleration $\hat{\ddot{\tau}}^{(n-1)}$ and clock drift $\hat{\ddot{T}}^{(n-1)}$ are computed as follows:

$$\hat{\ddot{\tau}}^{(n-1)} = \frac{\hat{\dot{\tau}}^{(n-1)} - \hat{\dot{\tau}}^{(n-3)}}{L_A^{(n-1)}} \qquad \text{Equation 58}$$

$$\hat{\ddot{T}}^{(n-1)} = \frac{\hat{\dot{T}}^{(n-1)} - \hat{\dot{T}}^{(n-3)}}{L_A^{(n-1)}} \qquad \text{Equation 59}$$

Substituting for Equations 57-59, Equations 52 and 53 reduce to a system of linear equations in $\hat{\tau}^{(n-1)}$ and $\hat{T}^{(n-1)}$. It is important to identify that, though these equations look highly non-linear, the nature of $\hat{l}_A^{(n-1)}$ forces them to a set of linear equations. It is, however, neither convenient nor intuitive to write it out explicitly. These estimates are extended to compute $\hat{\ddot{\tau}}^{(n-1)}$, $\hat{\dot{\tau}}^{(n-1)}$, $\hat{\ddot{T}}^{(n-1)}$, and $\hat{\dot{T}}^{(n-1)}$ using Equations 22, 23, 58, 59 respectively, and extrapolated to estimate delay and offset for (n)$^{th}$ frame using Equation 50 and 51 where $\hat{l}_A^{(n-1)}$ is replaced by $\hat{l}_A^{2,(n-1)}$ derived in Equation 57.

B. Tracking

1. State Transition

The state space transition for second order Markov model assumption is as follows:

$$\hat{x}_{(-)}^{(n-1)} = F(L_A^{(n-1)}) \hat{x}^{(n-3)} + w^{(n-1)} \qquad \text{Equation 60}$$

where $\hat{x}^{(k)}$ are state space variable at (k)$^{th}$ frame and F(•) is the state transition matrix that has the structure $F(\bullet) = \text{diag}(f(\bullet), f(\bullet))$ and relies on the cycle length $L_A^{(k)}$ computed at every cycle (see Equation 5):

$$\hat{x}^{(k)} = \begin{bmatrix} \hat{\tau}^{(k)} \\ \hat{\dot{\tau}}^{(k)} \\ \hat{\ddot{\tau}}^{(k)} \\ \hat{T}^{(k)} \\ \hat{\dot{T}}^{(k)} \\ \hat{\ddot{T}}^{(k)} \end{bmatrix}, f(L_A^{(k)}) = \begin{bmatrix} 1 & L_A^{(k)} & \tfrac{1}{2} L_A^{(k)2} \\ 0 & 1 & L_A^{(k)} \\ 0 & 0 & 1 \end{bmatrix} \qquad \text{Equation 61}$$

and $w^{(k)} \sim N(0, Q^{(k)})$ is a Gaussian perturbation in the model and $Q^{(k)} = \text{diag}(Q_\tau^{(k)}, Q_T^{(k)})$ is the state space noise covariance matrix with the following structure:

$$Q_\tau^{(k)} = \begin{bmatrix} \tfrac{1}{4} \sigma_\tau^2 L_A^{(k)4} & \tfrac{1}{2} \sigma_\tau^2 L_A^{(k)3} & \tfrac{1}{2} \sigma_\tau^2 L_A^{(k)2} \\ \tfrac{1}{2} \sigma_\tau^2 L_A^{(k)3} & \tfrac{1}{2} \sigma_\tau^2 L_A^{(k)2} & \sigma_\tau^2 L_A^{(k)} \\ \tfrac{1}{2} \sigma_\tau^2 L_A^{(k)2} & \sigma_\tau^2 L_A^{(k)} & \sigma_\tau^2 \end{bmatrix} \qquad \text{Equation 62}$$

where $Q_\tau^{(\bullet)}$ follows from a Gaussian velocity perturbation model whereas $Q_T^{(k)}$ relies on the clock models assumed and is dealt with next.

2. Clock Error Model

Studying clock errors has been an area of interest for decades. As a result, several error models have been proposed in literature. Here, a realistic clock is assumed with frequency drift $\ddot{T}$ on both the network nodes A and B, therefore the relative time offset conforms to second order Markov model. Under such scenario, the noise covariance matrix in T, $\dot{T}$, and $\ddot{T}$ is evaluated:

$$Q_T^{(k)} = \sigma_T^2 g_1(L_A^{(k)}) + \sigma_{\dot{T}}^2 g_2(L_A^{(k)}) + \sigma_{\ddot{T}}^2 g_3(L_A^{(k)}) \qquad \text{Equation 63}$$

with:

$$g_1(L_A^{(k)}) = \begin{bmatrix} L_A^{(k)} & 0 & 0 \\ 0 & 0 & 0 \\ 0 & 0 & 0 \end{bmatrix} \qquad \text{Equation 64}$$

$$g_2(L_A^{(k)}) = \begin{bmatrix} \tfrac{1}{3} L_A^{(k)} & \tfrac{1}{2} L_A^{(k)2} & 0 \\ \tfrac{1}{2} L_A^{(k)2} & L_A^{(k)} & 0 \\ 0 & 0 & 0 \end{bmatrix} \qquad \text{Equation 65}$$

-continued $$g_3(L_A^{(k)}) = \begin{bmatrix} \frac{1}{20}L_A^{(k)5} & \frac{1}{8}L_A^{(k)4} & \frac{1}{6}L_A^{(k)3} \\ \frac{1}{8}L_A^{(k)4} & \frac{1}{3}L_A^{(k)3} & \frac{1}{2}L_A^{(k)2} \\ \frac{1}{6}L_A^{(k)3} & \frac{1}{2}L_A^{(k)2} & L_A^{(k)} \end{bmatrix} \quad \text{Equation 66}$$

The clock error model is fit to the Allan variance of the oscillators in use to extract the model parameters $\sigma_T^2$, $\sigma_{\dot{T}}^2$, and $\sigma_{\ddot{T}}^2$.

3. Measurement Transition

The ToA estimates deduced via the two-way timing exchange serve as measurements for this Kalman filter set-up. Following Equations 18 and 19, the measurement transition model becomes:

$$\hat{z}_{(-)}^{(n-1)} = u^{(n-1)} + h(\hat{x}_{(-)}^{(n-1)}) + v^{(n-1)} \quad \text{Equation 67}$$

where $\hat{z}^{(k)}$ are the measurements, $u^{(k)}$ is the control vector at $(k)^{th}$ frame, subscript $(-)$ indicates prediction:

$$\hat{Z}^{(n-1)} = \begin{bmatrix} \hat{t}_{B,Rx}^{(n-1)} \\ \hat{t}_{A,Rx}^{(n)} \end{bmatrix}, u^{(n-1)} = \begin{bmatrix} t_{A,Tx}^{(n-1)} \\ t_{B,Tx}^{(n)} \end{bmatrix} \quad \text{Equation 68}$$

$h(\cdot)$ is the transition function as depicted below.

$$h(\hat{x}_{(-)}^{(n-1)}) = \quad \text{Equation 69}$$
$$\begin{bmatrix} \hat{\tau}^{(k)} - \hat{T}^{(k)} \\ \hat{\tau}^{(k)} + \hat{\dot{\tau}}^{(k)}\hat{l}_A^{2,(\cdot)} + \hat{\ddot{\tau}}^{(k)}\hat{l}_A^{2,(\cdot)} + \hat{T}^{(k)} + \hat{\dot{T}}^{(k)}\hat{l}_A^{2,(\cdot)} + \hat{\ddot{T}}^{(k)}\hat{l}_A^{2,(\cdot)} \end{bmatrix}$$

where $\hat{l}_A^{2,(\cdot)}$ is the second order estimate of frame length derived in Equation 57. $v^{(k)} \sim N(0, R^{(k)})$ is a Gaussian perturbation in the observation model and $R^{(k)}$ is the measurement covariance matrix:

$$R^{(k)} = \text{diag}(\sigma_{t_{A,Rx}}^2, \sigma_{t_{B,Rx}}^2) \quad \text{Equation 70}$$

where the variances $\sigma_{t_{A,Rx}}^2$ and $\sigma_{t_{B,Rx}}^2$ can be deduced by analyzing precision in estimating ToA exhibited by the joint positioning-communications system at a given SNR.

The relationship between the ToA estimates $(t_{(\cdot),Rx}^{(n-1)}, t_{(\cdot),Rx}^{(n)})$ and state space parameters is linearized using Jacobian as follows. At every cycle, once estimates of $\tau^{(n-1)}$, $\dot{\tau}^{(n-1)}$, $T^{(n-1)}$, and $\dot{T}^{(n-1)}$ are made, estimates for the frame (n) are made by interpolating as follows:

$$\hat{\tau}^{(n)} = \hat{\tau}^{(n-1)} + \hat{\dot{\tau}}^{(n-1)}\hat{l}_A^{(n-1)} + \frac{1}{2}\hat{\ddot{\tau}}^{(n-1)}\hat{l}_A^{(n-1)2} \quad \text{Equation 71}$$

$$\hat{T}^{(n)} = \hat{T}^{(n-1)} + \hat{\dot{T}}^{(n-1)}\hat{l}_A^{(n-1)} + \frac{1}{2}\hat{\ddot{T}}^{(n-1)}\hat{l}_A^{(n-1)2} \quad \text{Equation 72}$$

Hence an EKF algorithm is used that linearizes $h(\cdot)$ using Jacobian H, derived as follows:

$$\frac{\partial h(\hat{x})}{\partial \hat{x}}\bigg|_{\hat{x}_{(-)}^{(n-1)}} = \quad \text{Equation 73}$$
$$\begin{bmatrix} \frac{\partial h(\hat{x})}{\partial \hat{\tau}} & \frac{\partial h(\hat{x})}{\partial \hat{\dot{\tau}}} & \frac{\partial h(\hat{x})}{\partial \hat{\ddot{\tau}}} & \frac{\partial h(\hat{x})}{\partial \hat{T}} & \frac{\partial h(\hat{x})}{\partial \hat{\dot{T}}} & \frac{\partial h(\hat{x})}{\partial \hat{\ddot{T}}} \end{bmatrix}\bigg|_{\hat{x}_{(-)}^{(n-1)}}$$

where:

$$\frac{\partial h(\hat{x})}{\partial \hat{\tau}}\bigg|_{\hat{x}_{(-)}^{(n-1)}} = \begin{bmatrix} 1 \\ 1 \end{bmatrix}, \frac{\partial h(\hat{x})}{\partial \hat{\dot{\tau}}}\bigg|_{\hat{x}_{(-)}^{(n-1)}} = \begin{bmatrix} 0 \\ \hat{l}_A^{(n-1)} \end{bmatrix}, \quad \text{Equation 74}$$

$$\frac{\partial h(\hat{x})}{\partial \hat{\ddot{\tau}}}\bigg|_{\hat{x}_{(-)}^{(n-1)}} = \begin{bmatrix} 0 \\ \frac{1}{2}\hat{l}_A^{(n-1)2} \end{bmatrix}$$

$$\frac{\partial h(\hat{x})}{\partial \hat{T}}\bigg|_{\hat{x}_{(-)}^{(n-1)}} = \begin{bmatrix} -1 \\ 1 + \left(\hat{\dot{\tau}}^{(n-1)} + \hat{\dot{T}}^{(n-1)}\right)\frac{\partial \hat{l}_A(\hat{x})}{\partial \hat{T}}\bigg|_{\hat{x}_{(-)}^{(n-1)}} \\ + \left(\hat{\ddot{\tau}}^{(n-1)} + \hat{\ddot{T}}^{(n-1)}\right)\hat{l}_A^{(n-1)}\frac{\partial \hat{l}_A(\hat{x})}{\partial \hat{T}}\bigg|_{\hat{x}_{(-)}^{(n-1)}} \end{bmatrix} \quad \text{Equation 75}$$

$$\frac{\partial h(\hat{x})}{\partial \hat{\dot{T}}}\bigg|_{\hat{x}_{(-)}^{(n-1)}} = \begin{bmatrix} 0 \\ \hat{l}_A^{(n-1)} + \left(\hat{\dot{\tau}}^{(n-1)} + \hat{\dot{T}}^{(n-1)}\right)\frac{\partial \hat{l}_A(\hat{x})}{\partial \hat{\dot{T}}}\bigg|_{\hat{x}_{(-)}^{(n-1)}} \\ + \left(\hat{\ddot{\tau}}^{(n-1)} + \hat{\ddot{T}}^{(n-1)}\right)\hat{l}_A^{(n-1)}\frac{\partial \hat{l}_A(\hat{x})}{\partial \hat{\dot{T}}}\bigg|_{\hat{x}_{(-)}^{(n-1)}} \end{bmatrix} \quad \text{Equation 76}$$

$$\frac{\partial h(\hat{x})}{\partial \hat{\ddot{T}}}\bigg|_{\hat{x}_{(-)}^{(n-1)}} = \begin{bmatrix} 0 \\ \frac{1}{2}\hat{l}_A^{(n-1)2} + \left(\hat{\dot{\tau}}^{(n-1)} + \hat{\dot{T}}^{(n-1)}\right)\frac{\partial \hat{l}_A(\hat{x})}{\partial \hat{\ddot{T}}}\bigg|_{\hat{x}_{(-)}^{(n-1)}} \\ + \left(\hat{\ddot{\tau}}^{(n-1)} + \hat{\ddot{T}}^{(n-1)}\right)\hat{l}_A^{(n-1)}\frac{\partial \hat{l}_A(\hat{x})}{\partial \hat{\ddot{T}}}\bigg|_{\hat{x}_{(-)}^{(n-1)}} \end{bmatrix} \quad \text{Equation 77}$$

and $$\frac{\partial \hat{l}_A(\hat{x})}{\partial \hat{T}}\bigg|_{\hat{x}_{(-)}^{(n-1)}} = \frac{1}{\hat{\dot{v}}^{(n-1)}}, \quad \text{Equation 78}$$

$$\frac{\partial \hat{l}_A(\hat{x})}{\partial \hat{\dot{T}}}\bigg|_{\hat{x}_{(-)}^{(n-1)}} = \frac{-1}{\hat{\dot{T}}^{(n-1)}}\left(\frac{\hat{\dot{T}}^{(n-1)} - 1}{\hat{\dot{v}}^{(n-1)}} + 1\right)$$

$$\frac{\partial \hat{l}_A(\hat{x})}{\partial \hat{\ddot{T}}}\bigg|_{\hat{x}_{(-)}^{(n-1)}} = \frac{\hat{T}^{(n-1)} - t_{A,Tx}^{(n-1)} + t_{B,Tx}^{(n-1)}}{\hat{\ddot{T}}^{(n-1)}\hat{\dot{v}}^{(n-1)}} + \frac{\hat{\dot{v}}^{(n-1)} + \hat{\dot{T}}^{(n-1)} - 1}{\hat{\ddot{T}}^{(n-1)2}} \quad \text{Equation 79}$$

where:

$$\hat{\dot{v}}^{(n-1)} = \sqrt{(\hat{\dot{T}}^{(n-1)} - 1)^2 - 2\hat{\ddot{\tau}}^{(n-1)}(T^{(n-1)} - t_{A,Tx}^{(n-1)} + t_{B,Tx}^{(n-1)})} \quad \text{Equation 80}$$

VI. Method for Tracking Position Information

Figure 7:
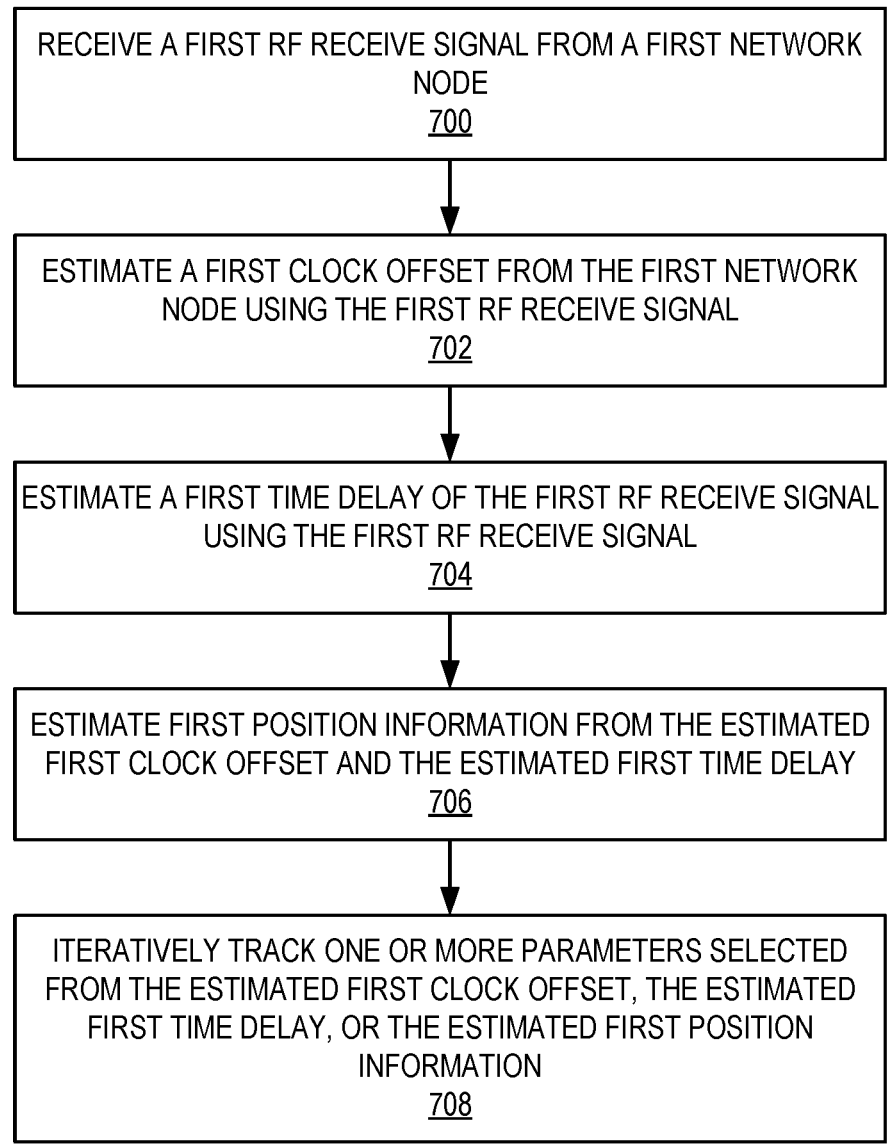
FIG. 7 is a flow diagram illustrating a process for tracking position information in a distributed RF communications system.

FIG. 7 is a flow diagram illustrating a process for tracking position information in a distributed RF communications system. The process begins at operation 700, with receiving a first RF receive signal from a first network node. The process continues at operation 702, with estimating a first clock offset from the first network node using the first RF receive signal. The process continues at operation 704, with estimating a first time delay of the first RF receive signal using the first RF receive signal. The process continues at operation 706, with estimating first position information from the estimated first clock offset and the estimated first time delay. The process continues at operation 708, with iteratively tracking one or more parameters selected from the estimated first clock offset, the estimated first time delay, or the estimated first position information.

Although the operations of FIG. 7 are illustrated in a series, this is for illustrative purposes and the operations are not necessarily order dependent. Some operations may be performed in a different order than that presented. Further, processes within the scope of this disclosure may include fewer or more steps than those illustrated in FIG. 7.

VII. Computer System

Figure 8:
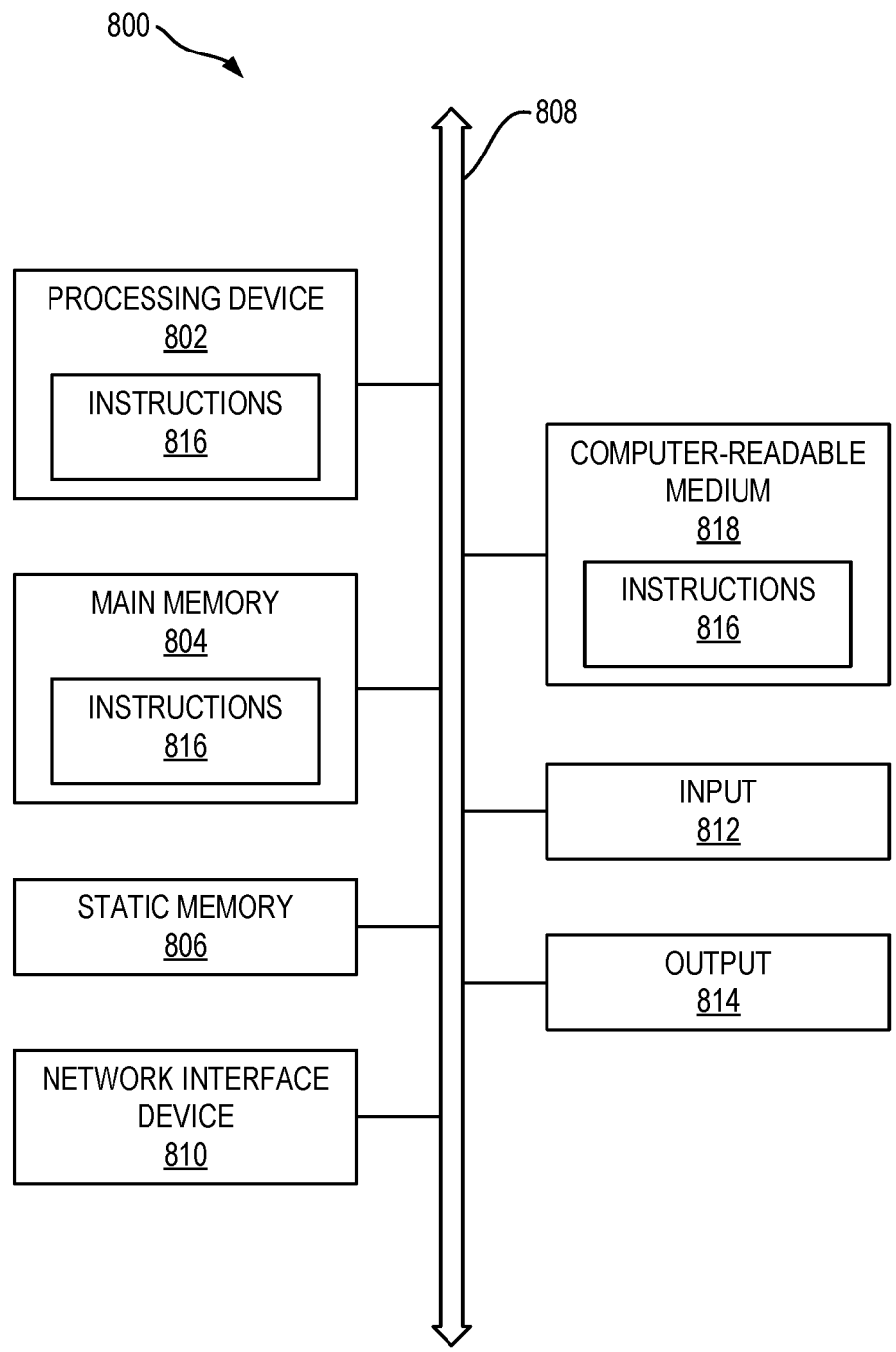
FIG. 8 is a schematic diagram of a generalized representation of an exemplary computer system that could be used to perform any of the methods or functions described above, such as tracking position information in a distributed RF communications system.

FIG. 8 is a schematic diagram of a generalized representation of an exemplary computer system 800 that could be used to perform any of the methods or functions described above, such as tracking position information in a distributed RF communications system. In some examples, one or more of the network nodes 20, 22 of FIG. 2 are implemented as the computer system 800. In this regard, the computer system 800 may be a circuit or circuits included in an electronic board card, such as, a printed circuit board (PCB), a server, a personal computer, a desktop computer, a laptop computer, an array of computers, a personal digital assistant (PDA), a computing pad, a mobile device, or any other device, and may represent, for example, a server or a user's computer.

The exemplary computer system 800 in this embodiment includes a processing device 802 or processor (e.g., the signal processor 30 of FIG. 2), a main memory 804 (e.g., read-only memory (ROM), flash memory, dynamic random access memory (DRAM), such as synchronous DRAM (SDRAM), etc.), and a static memory 806 (e.g., flash memory, static random access memory (SRAM), etc.), which may communicate with each other via a data bus 808. Alternatively, the processing device 802 may be connected to the main memory 804 and/or static memory 806 directly or via some other connectivity means. In an exemplary aspect, the processing device 802 could be used to perform any of the methods or functions described above.

The processing device 802 represents one or more general-purpose processing devices, such as a microprocessor, central processing unit (CPU), or the like. More particularly, the processing device 802 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processing device 802 is configured to execute processing logic in instructions for performing the operations and steps discussed herein.

The various illustrative logical blocks, modules, and circuits described in connection with the embodiments disclosed herein may be implemented or performed with the processing device 802, which may be a microprocessor, field programmable gate array (FPGA), a digital signal processor (DSP), an application-specific integrated circuit (ASIC), or other programmable logic device, a discrete gate or transistor logic, discrete hardware components, or any combination thereof designed to perform the functions described herein. Furthermore, the processing device 802 may be a microprocessor, or may be any conventional processor, controller, microcontroller, or state machine. The processing device 802 may also be implemented as a combination of computing devices (e.g., a combination of a DSP and a microprocessor, a plurality of microprocessors, one or more microprocessors in conjunction with a DSP core, or any other such configuration).

The computer system 800 may further include a network interface device 810. The computer system 800 also may or may not include an input 812, configured to receive input and selections to be communicated to the computer system 800 when executing instructions. The input 812 may include, but not be limited to, a touch sensor (e.g., a touch display), an alphanumeric input device (e.g., a keyboard), and/or a cursor control device (e.g., a mouse). In an exemplary aspect, the RF transceiver 24 of FIG. 2 is an input 812 to the computer system 800. The computer system 800 also may or may not include an output 814, including but not limited to a display, a video display unit (e.g., a liquid crystal display (LCD) or a cathode ray tube (CRT)), or a printer. In some examples, some or all inputs 812 and outputs 814 may be combination input/output devices. In an exemplary aspect, the RF transceiver 24 of FIG. 2 is also an output 814 of the computer system 800.

The computer system 800 may or may not include a data storage device that includes instructions 816 stored in a computer-readable medium 818. The instructions 816 may also reside, completely or at least partially, within the main memory 804 and/or within the processing device 802 during execution thereof by the computer system 800, the main memory 804, and the processing device 802 also constituting computer-readable medium. The instructions 816 may further be transmitted or received via the network interface device 810.

While the computer-readable medium 818 is shown in an exemplary embodiment to be a single medium, the term "computer-readable medium" should be taken to include a single medium or multiple media (e.g., a centralized or distributed database, and/or associated caches and servers) that store the one or more sets of instructions 816. The term "computer-readable medium" shall also be taken to include any medium that is capable of storing, encoding, or carrying a set of instructions for execution by the processing device 802 and that causes the processing device 802 to perform any one or more of the methodologies of the embodiments disclosed herein. The term "computer-readable medium" shall accordingly be taken to include, but not be limited to, solid-state memories, optical medium, and magnetic medium.

The operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined.

Those skilled in the art will recognize improvements and modifications to the preferred embodiments of the present disclosure. All such improvements and modifications are considered within the scope of the concepts disclosed herein and the claims that follow.

What is claimed is:

1. A method for tracking position information in a distributed radio frequency (RF) communications system, the method comprising:
receiving a first RF receive signal from a first network node, wherein the first RF receive signal comprises a first positioning sequence;
estimating a first clock offset from the first network node using the first RF receive signal, wherein the first clock offset is estimated using the first positioning sequence;
estimating a first time delay of the first RF receive signal using the first RF receive signal, wherein the first time delay is estimated using the first positioning sequence;
estimating first position information from the estimated first clock offset and the estimated first time delay;

iteratively tracking one or more parameters selected from the estimated first clock offset, the estimated first time delay, or the estimated first position information by applying a filtering technique that predicts one or more state predictions of the one or more parameters based on measurements of the one or more parameters during previous cycles and corrects the measurements by evaluating a weighted sum of the one or more state predictions and deviation of the one or more state predictions from observed state measurements;

receiving a second RF receive signal comprising a second positioning sequence from the first network node;

estimating a second time delay of the second RF receive signal using the second positioning sequence;

receiving a third RF receive signal comprising a third positioning sequence from the first network node;

estimating a third time delay of the third RF receive signal using the third positioning sequence;

receiving a fourth RF receive signal comprising a fourth positioning sequence from the first network node;

estimating a fourth time delay of the fourth RF receive signal using the fourth positioning sequence; and estimating a relative position of the first network node from the estimated first clock offset, the estimated first time delay, the estimated second time delay, and the estimated third time delay, and an estimated fourth time delay.

2. The method of claim 1, wherein iteratively tracking the one or more parameters comprises applying linear or non-linear adaptive filtering to each of the one or more parameters.

3. The method of claim 2, wherein applying the linear or non-linear adaptive filtering comprises applying a Kalman filter or a particle filter to each of the one or more parameters.

4. The method of claim 1, wherein iteratively tracking the one or more parameters comprises applying adaptive estimation to each of the one or more parameters.

5. The method of claim 1, further comprising adjusting the one or more parameters based on the iterative tracking of the one or more parameters.

6. The method of claim 1, wherein the first RF receive signal is received over a joint positioning-communications waveform.

7. The method of claim 1, wherein the first position information comprises a time-of-flight (ToF) from the first network node.

8. The method of claim 7, wherein tracking the one or more parameters comprises tracking the estimated first clock offset and the estimated first time delay to account for an oscillator nonlinearity.

9. The method of claim 7, further comprising estimating a relative range of the first network node from the ToF from the first network node.

10. The method of claim 7, further comprising estimating at least one of a relative position or a relative orientation to the first network node from the ToF of multiple antennas from the first network node.

11. The method of claim 10, wherein tracking the one or more parameters comprises tracking the at least one of the relative position or the relative orientation to the first network node by adapting to loss of line-of-sight of any antenna of the multiple antennas.

12. The method of claim 1, further comprising:
receiving the second RF receive signal from a second network node;
estimating a second clock offset from the second network node using the first RF receive signal; and
wherein tracking the one or more parameters comprises tracking the estimated first clock offset and the estimated second clock offset.

13. The method of claim 1, further comprising fusing sensor data with iteratively tracking the one or more parameters.

14. The method of claim 1, wherein each of the first RF receive signal, the second RF receive signal, the third RF receive signal, and the fourth RF receive signal is received from a different antenna of the first network node.

15. The method of claim 1, wherein the first RF receive signal, the second RF receive signal, the third RF receive signal, and the fourth RF receive signal comprise a joint positioning-communications waveform.

16. The method of claim 15, wherein the first RF receive signal comprises a data payload of the joint positioning-communications waveform.

17. The method of claim 16, wherein the second RF receive signal, the third RF receive signal, and the fourth RF receive signal do not comprise the data payload of the joint positioning-communications waveform.

18. A radio frequency (RF) device, comprising: an RF transceiver; and a signal processor coupled to the RF transceiver and configured to: receive, from the RF transceiver, a first RF receive signal comprising a first positioning sequence of a first network node; estimate a first clock offset from the first network node using the first RF receive signal, wherein the first clock offset is estimated using the first positioning sequence; estimate a first time delay of the first RF receive signal using the first positioning sequence, wherein the first time delay is estimated using the first positioning sequence; estimate first position information from the estimated first time delay; iteratively track the estimated first time delay to adjust the first position information by applying a filtering technique that predicts one or more state predictions of one or more parameters based on measurements of the one or more parameters during previous cycles and corrects the measurements by evaluating a weighted sum of the one or more state predictions and deviation of the one or more state predictions from observed state measurements; receive a second RF receive signal comprising a second positioning sequence from the first network node; estimate a second time delay of the second RF receive signal using the second positioning sequence; receive a third RF receive signal comprising a third positioning sequence from the first network node; estimate a third time delay of the third RF receive signal using the third positioning sequence; receive a fourth RF receive signal comprising a fourth positioning sequence from the first network node; and estimate a fourth time delay of the fourth RF receive signal using the fourth positioning sequence; estimate a relative position of the first network node from the estimated first clock offset, the estimated first time delay, the estimated second time delay, the estimated third time delay, and the estimated fourth time delay.

19. The RF device of claim 18, wherein:
the first RF receive signal is received over a first antenna of a plurality of antennas coupled to the RF transceiver; and
the signal processor is further configured to:
track the estimated first time delay, the estimated second time delay, and the estimated third time delay to adjust the estimated relative position of the first network node.

20. The RF device of claim 18, further comprising a sensor coupled to the signal processor; and
  wherein the signal processor is further configured to track the estimated first time delay and data received from the sensor to adjust the first position information.

21. The RF device of claim 20, wherein the sensor comprises an inertial measurement unit.

22. A distributed radio frequency (RF) communications system, comprising:
  a first RF device, comprising:
    a first RF transceiver; and
    a first signal processor coupled to the first RF transceiver, the first signal processor configured to:
      receive, from the first RF transceiver, a first RF receive signal from a second RF device, wherein the first RF receive signal comprises a first positioning sequence;
      estimate a first clock offset from the second RF device using the first RF receive signal, wherein the first clock offset is estimated using the first positioning sequence;
      estimate a first time delay of the first RF receive signal using the first RF receive signal, wherein the first time delay is estimated using the first positioning sequence;
      estimate first position information from the estimated first clock offset and the estimated first time delay;
      iteratively track one or more parameters selected from the estimated first clock offset, the estimated first time delay, or the estimated first position information by applying a filtering technique that predicts one or more state predictions of the one or more parameters based on measurements of the one or more parameters during previous cycles and corrects the measurements by evaluating a weighted sum of the one or more state predictions and deviation of the one or more state predictions from observed state measurements;
      receive a second RF receive signal comprising a second positioning sequence from a first network node;
      estimate a second time delay of the second RF receive signal using the second positioning sequence;
      receive a third RF receive signal comprising a third positioning sequence from the first network node;
      estimate a third time delay of the third RF receive signal using the third positioning sequence;
      estimate a relative position of the first network node from the estimated first clock offset, the estimated first time delay, the estimated second time delay, and the estimated third time delay:
      receive a fourth RF receive signal comprising a fourth positioning sequence from the first network node;
      estimate a fourth time delay of the fourth RF receive signal using the fourth positioning sequence;
      estimate a relative position of the first network node from the estimated first clock offset, the estimated first time delay, the estimated second time delay, the estimated third time delay, and thean estimated fourth time delay.

23. The distributed RF communications system of claim 22, further comprising the second RF device, comprising:
  a second RF transceiver; and
  a second signal processor coupled to the second RF transceiver, the second signal processor configured to:
  cause the second RF transceiver to transmit the first RF receive signal from a first antenna;
  cause the second RF transceiver to transmit the second RF receive signal from a second antenna; and
  cause the second RF transceiver to transmit the third RF receive signal from a third antenna.

* * * * *